US012650924B1

(12) United States Patent
Berger et al.

(10) Patent No.: US 12,650,924 B1
(45) Date of Patent: Jun. 9, 2026

(54) SUB CACHE LINE POSITION MANAGEMENT

(71) Applicant: International Business Machines Corporation, Armonk, NY (US)

(72) Inventors: Deanna Postles Dunn Berger, Hyde Park, NY (US); Craig R. Walters, Highland, NY (US); Alper Buyuktosunoglu, White Plains, NY (US); David Trilla Rodríguez, New York, NY (US); Ram Sai Manoj Bamdhamravuri, Austin, TX (US); Ashraf Elsharif, Austin, TX (US); Jason D Kohl, Austin, TX (US); Jonah Hendler, Roslyn, NY (US); Guy G. Tracy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/972,834

(22) Filed: Dec. 6, 2024

(51) Int. Cl.
*G06F 12/0871* (2016.01)
*G06F 12/0873* (2016.01)
*G06F 12/0895* (2016.01)

(52) U.S. Cl.
CPC ...... *G06F 12/0871* (2013.01); *G06F 12/0873* (2013.01); *G06F 12/0895* (2013.01)

(58) Field of Classification Search
CPC ............. G06F 12/0871; G06F 12/0873; G06F 12/0895
See application file for complete search history.

(56) References Cited

U.S. PATENT DOCUMENTS

| | | | |
|---|---|---|---|
| 8,868,837 B2 | 10/2014 | Gara et al. | |
| 9,086,974 B2 | 7/2015 | Busaba et al. | |
| 9,529,717 B2 | 12/2016 | Guthrie et al. | |
| 10,031,849 B2 | 7/2018 | Hagersten et al. | |
| 11,630,920 B2 | 4/2023 | Durham et al. | |
| 2014/0040542 A1* | 2/2014 | Kim .................... | G06F 12/0877 711/131 |
| 2015/0178200 A1* | 6/2015 | Kim .................... | G06F 12/0811 711/118 |

(Continued)

FOREIGN PATENT DOCUMENTS

WO      WO-2018013282 A1 *    1/2018    ......... G06F 12/0897

OTHER PUBLICATIONS

Authors et. al., "Aggressive Client-Side Cache Data Retrieval Agent Based on Usage Heuristics", an IP.com Prior Art Database Technical Disclosure, IP.com No. IPCOM000196977D, Jun. 22, 2010, 3 pages.

(Continued)

*Primary Examiner* — Tasnima Matin
(74) *Attorney, Agent, or Firm* — Onyx IP Group

(57) ABSTRACT

In some implementations, a computer system obtains sub cache line (SCL) access pattern information associated with a set of SCLs of a cache line. The system determines a predicted SCL access pattern based on the SCL access pattern information. The system establishes a physical position mapping of the set of SCLs within the cache line based on the predicted SCL access pattern, and performs a cache transaction in accordance with the physical position mapping. The system optimizes cache performance by dynamically reordering SCL positions based on observed access patterns.

20 Claims, 19 Drawing Sheets

(56)          References Cited

U.S. PATENT DOCUMENTS

2022/0365881 A1*  11/2022  Granovsky ......... G06F 12/0891
2023/0004318 A1*   1/2023  Zhang ................... G06F 3/0611
2024/0184581 A1*   6/2024  Alexander .......... G06F 12/0862

OTHER PUBLICATIONS

Authors et al., "Avoiding Deadlocks in a Multi-Processor Environ-
ment with a First Level Cache Using a Logical Directory", an
IP.com Prior Art Database Technical Disclosure, IP.com No.
IPCOM000271077D, Oct. 12, 2022, 5 pages.
Authors et al., "System and Method for Software Debug using Fast
CacheSimulation by Separation of Data and Tag Views", an IP.com
Prior Art Database Technical Disclosure, IP.com No.
IPCOM000267673D, Nov. 15, 2021, 18 pages.
Bai et al., "Method and System for Providing Gain-Based Heuristic
Technique in Image Hosting Services", an IP.com Prior Art Data-
base Technical Disclosure, IP.com No. IPCOM000254603D, Jul.
17, 2018, 8 pages.
Liu et al., "An Imitation Learning Approach for Cache Replace-
ment", arXiv, Jul. 9, 2020, 14 pages.
Srinivasan, "Improving Cache Utilization", Technical Report, No.
800, University of Cambridge, Jun. 2011, 184 pages.
Tromer et al., "Efficient Cache Attacks on AES, and Countermea-
sures", Journal of Cryptology, vol. 23, Jul. 2009, 34 pages.
Yang et al., "Machine Learning Over Heuristic: a Learned Cache
Eviction Framework with Minimal Overhead", arXiv, Jan. 27, 2023,
13 pages.

* cited by examiner

Line boundary wrap example
* QLO='01'b means:
  * Phy OW0 slot contains OW2
  * Phy OW1,2,3,4,5,6,7 slots contain OW 3,4,5,6,7,0,1

402 — Directory
'01' QLO

404 — Cache

| Content | 2 | 3 | 4 | 5 | 6 | 7 | 0 | 1 |
|---|---|---|---|---|---|---|---|---|
| Physical OW Location | 0 | 1 | 2 | 3 | 4 | 5 | 6 | 7 |

| QLO | Line Boundary Wrap OW Order | Zero Origin Wrap Order |
|---|---|---|
| '00'b | 01 23 45 67 | 01 23 45 67 |
| '01'b | 23 45 67 01 | 23 01 45 67 |
| '10'b | 45 67 01 23 | 45 01 23 67 |
| '11'b | 67 01 23 45 | 67 01 23 45 |

400

500

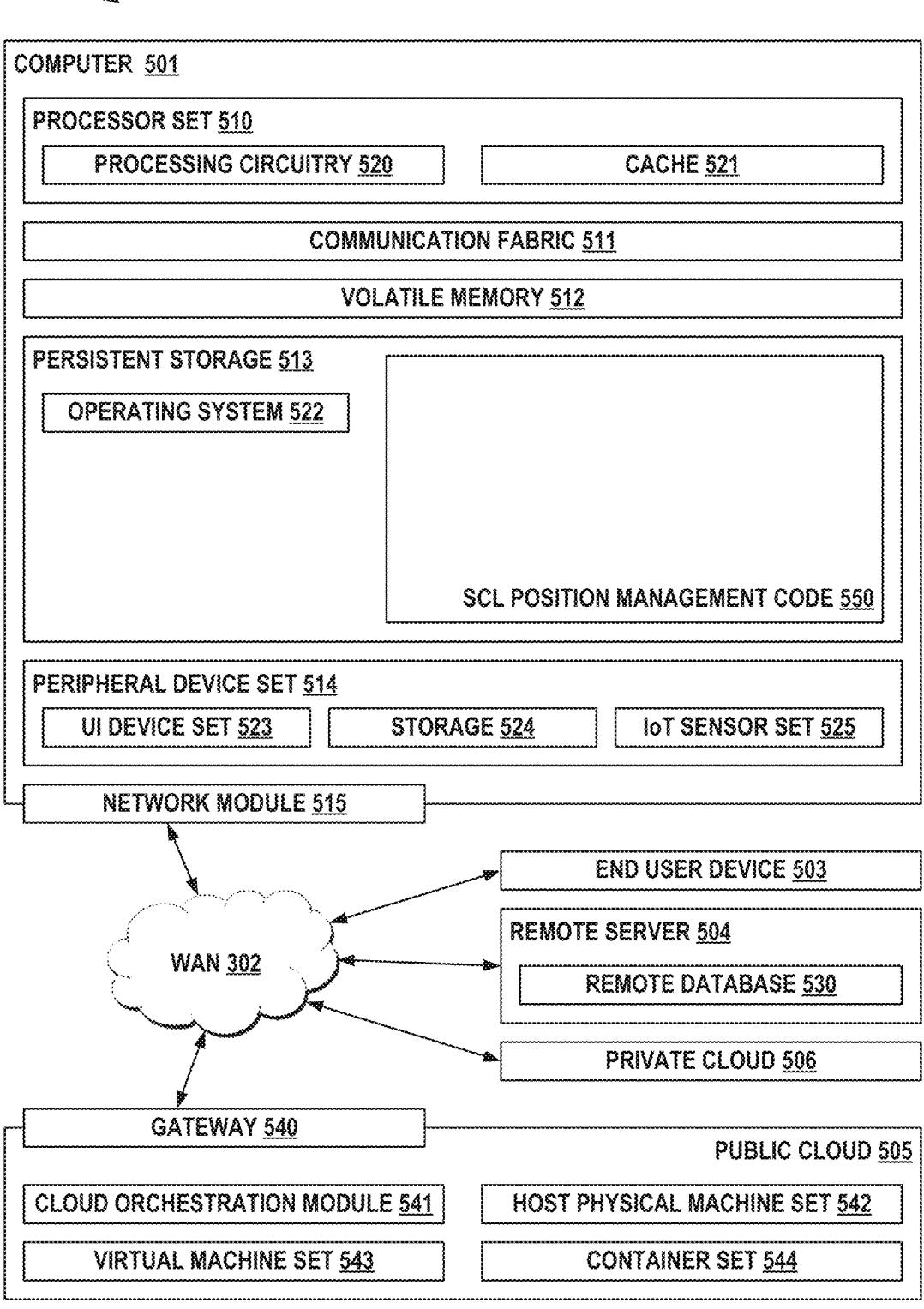

COMPUTER 501

PROCESSOR SET 510

PROCESSING CIRCUITRY 520          CACHE 521

COMMUNICATION FABRIC 511

VOLATILE MEMORY 512

PERSISTENT STORAGE 513

OPERATING SYSTEM 522

SCL POSITION MANAGEMENT CODE 550

PERIPHERAL DEVICE SET 514

UI DEVICE SET 523    STORAGE 524    IoT SENSOR SET 525

NETWORK MODULE 515

WAN 302

END USER DEVICE 503

REMOTE SERVER 504

REMOTE DATABASE 530

PRIVATE CLOUD 506

GATEWAY 540

PUBLIC CLOUD 505

CLOUD ORCHESTRATION MODULE 541    HOST PHYSICAL MACHINE SET 542

VIRTUAL MACHINE SET 543    CONTAINER SET 544

810 OBTAINING SUB CACHE LINE (SCL) ACCESS PATTERN INFORMATION ASSOCIATED WITH A SET OF SCLS OF A CACHE LINE

820 REORDERING, BASED ON THE SCL ACCESS PATTERN INFORMATION, A PHYSICAL POSITION OF AT LEAST TWO SCLS OF THE SET OF SCLS WITHIN THE CACHE LINE

830 PERFORMING A CACHE TRANSACTION IN ACCORDANCE WITH THE PHYSICAL POSITION MAPPING

SUB CACHE LINE POSITION MANAGEMENT

BACKGROUND

The present disclosure relates to computer caches, and for example, relates to sub cache line position management.

SUMMARY

According to an aspect of the present disclosure, a computer system is provided. The computer system includes a processor set, one or more computer-readable storage media, and program instructions stored on the one or more computer-readable storage media. The program instructions cause the processor set to perform operations. These operations include obtaining sub cache line (SCL) access pattern information associated with a set of SCLs of a cache line; determining a predicted SCL access pattern based on the SCL access pattern information; establishing, based on the predicted SCL access pattern, a physical position mapping of the set of SCLs within the cache line; and performing a cache transaction in accordance with the physical position mapping.

According to another aspect of the present disclosure, a method is provided. The method includes obtaining SCL access pattern information associated with a set of SCLs of a cache line; reordering, based on the SCL access pattern information, a physical position of at least two SCLs of the set of SCLs within the cache line; and performing a cache transaction in accordance with the physical position mapping.

According to a further aspect of the present disclosure, a computer program product is provided. The computer program product includes one or more computer-readable storage media and program instructions stored on the one or more computer-readable storage media. The program instructions perform operations. These operations include obtaining SCL access pattern information associated with a set of SCLs of a cache line; reordering, based on the SCL access pattern information, a physical position of at least two SCLs of the set of SCLs within the cache line; and performing a cache transaction in accordance with the physical position mapping.

BRIEF DESCRIPTION OF THE DRAWINGS

FIG. 5 is a diagram of an example computing environment in which systems and/or methods described herein may be implemented.

DETAILED DESCRIPTION

Figure 1A:
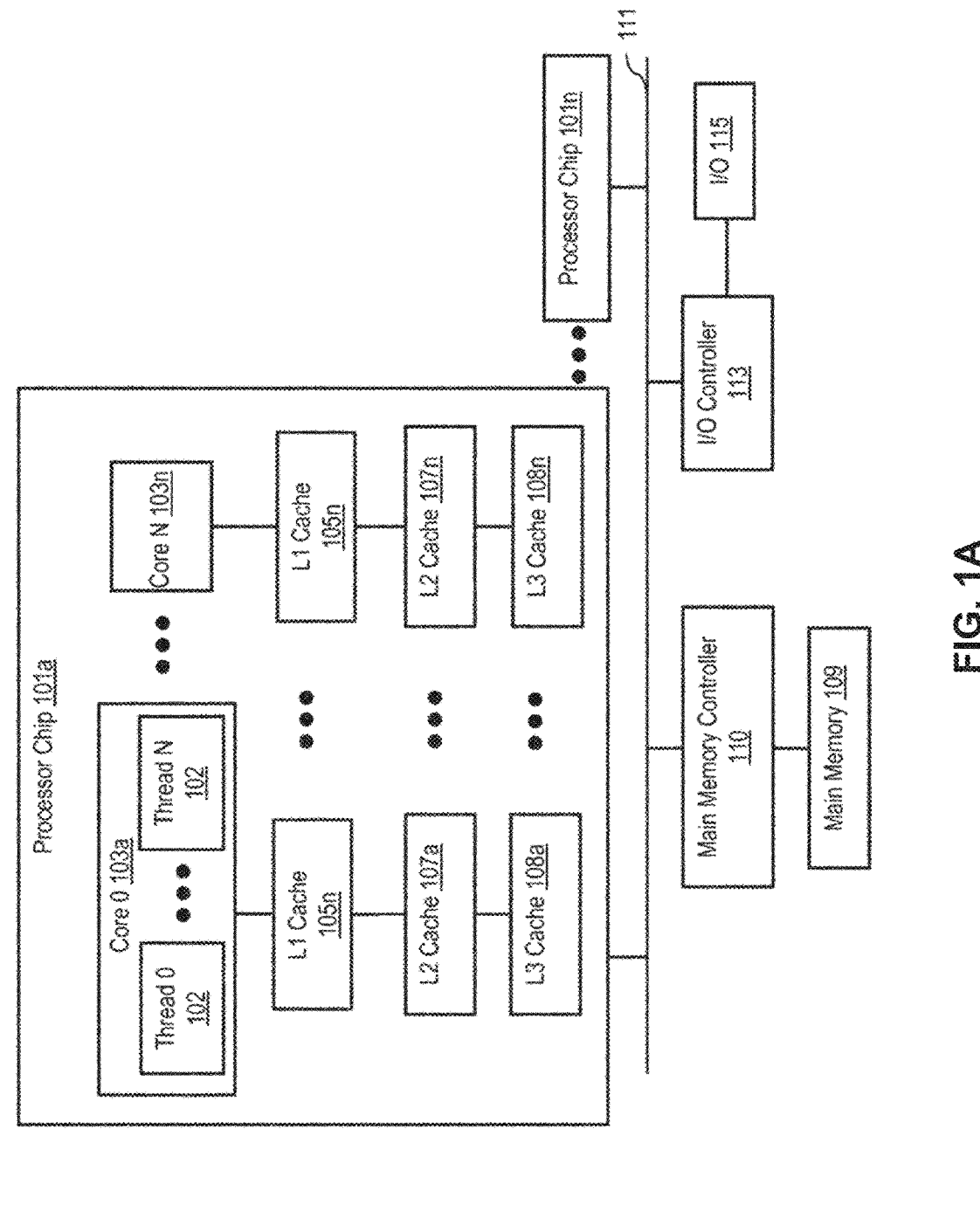
FIG. 1A is a diagram of an example computer system described herein.

The following detailed description of example implementations refers to the accompanying drawings. The same reference numbers in different drawings may identify the same or similar elements.

Modern microprocessors typically include entire storage hierarchies (caches) integrated into a single integrated circuit. For example, one or more processor cores that include level 1 (L1) instruction and/or data caches are often combined with a shared on-chip level 2 (L2) cache and may be combined with a shared on-chip level 3 (L3) cache. Caches in a cache hierarchy typically include cache directories that, among other functions, maintain one or more cache coherency states for each cache line in a cache array.

Banked cache designs are widely used in modern computing systems, particularly in servers and high-performance processors, to manage large amounts of data efficiently. These designs typically involve dividing cache lines into multiple subsets or banks that can be accessed independently. However, as cache line sizes have grown to accommodate increasing data demands, processors often only require a subset of the entire line for many operations. This mismatch between the full cache line size and the actual data needed by the processor presents significant challenges in terms of access latency and overall system performance.

A primary challenge stems from the fixed ordering of cache line subsets in traditional banked cache designs. When a processor requests data from a specific subset of a cache line, the access latency can vary significantly depending on the physical location of that subset within the cache. Subsets located closer to the requesting processor can be accessed more quickly than subsets positioned farther away. This variability in access times can lead to unpredictable performance and potentially substantial latency penalties, especially in systems with large cache lines where the difference in access times between the nearest and farthest subsets can be significant.

Furthermore, current cache designs lack the flexibility to adapt to changing access patterns dynamically. As workloads evolve and data access patterns shift, the fixed ordering of cache line subsets becomes increasingly inefficient. This rigidity can result in suboptimal cache utilization, increased power consumption, and missed opportunities for performance optimization. The challenge lies in developing a cache design that can intelligently reorder cache line subsets based on actual usage patterns, without introducing significant complexity or overhead to the system.

Implementations of this disclosure address problems such as these by obtaining sub cache line (SCL) access pattern information associated with a set of SCLs of a cache line, determining a predicted SCL access pattern based on the SCL access pattern information, establishing a physical position mapping of the set of SCLs within the cache line based on the predicted SCL access pattern, and performing cache transactions in accordance with the physical position mapping. As used herein, the term "sub cache line" or "SCL" refers to a subset of a cache line, such as an octword (OW) or quarter line (QL), that can be independently accessed and reordered within the cache line. The SCL access pattern information may be stored in various data structures, including but not limited to an SCL table, a level 2 cache directory, a hardware data structure associated with a shared cache, a hardware data structure provided by a processor core, or in software via a processor core.

The predicted SCL access pattern is determined based on various factors, which may include the frequency of SCL access, prior access source, current SCL target, prior persistence activity, and cache management hints. The source may refer to the type of requestor (processor, input output (IO), hardware (HW) acceleration engine, etc) that last utilized the SCL. Cache management hints may be software-directed or firmware-directed, allowing for flexible optimization strategies. For example, a software-directed hint might prioritize certain SCLs based on application-specific knowledge, while a firmware-directed hint could optimize SCL ordering based on hardware-level insights obtained via existing hardware-firmware interaction methods. The physical position mapping established based on this predicted pattern involves reordering the physical positions of SCLs within the cache line, effectively altering the proximity of specific data subsets to the requesting processor.

Cache transactions performed in accordance with the physical position mapping may include data returns that are optimized based on the availability of 'fastpath' bussing. Fastpath bussing in this context refers to the return of data to the requestor without the utilization of one or more dataflow buffers. Such fastpath may only be taken if the shared buses in the data path are available at the time of the data return. Depending on the system state, data may be returned in an order based on either physical proximity or the requested order of SCLs, whichever is determined to be more efficient. This adaptive approach allows for dynamic optimization of data access patterns, addressing the inefficiencies present in traditional fixed-order cache designs. Furthermore, the SCL access pattern information can be persisted in main memory, allowing for consistent optimization across different levels of the memory hierarchy and system states. This persistence enables the system to maintain optimized SCL orderings even as data moves between cache levels or is evicted to and retrieved from main memory.

In some implementations, the physical position of sub cache lines (SCLs) within a cache line is dynamically reordered based on access pattern information. Accordingly, an advantage of the dynamic reordering of SCLs is improved cache performance by reducing average access latency for frequently accessed data subsets. Additionally, an advantage of the dynamic reordering of SCLs is increased flexibility in cache design, allowing for adaptation to changing workloads and access patterns without requiring hardware modifications.

In some implementations, SCL access pattern information is collected and stored in a hardware data structure associated with the cache, such as an SCL table or cache directory. Accordingly, an advantage of storing SCL access pattern information is the ability to make informed decisions about SCL reordering based on historical usage data. Additionally, an advantage of storing SCL access pattern information is the potential for implementing more sophisticated prediction algorithms to optimize cache line subset ordering.

In some implementations, the SCL access pattern information is persisted across different levels of the cache hierarchy and into main memory. Accordingly, an advantage of persisting SCL access pattern information is the maintenance of optimized SCL orderings even as data moves between cache levels or is evicted to and retrieved from main memory. Additionally, an advantage of persisting SCL access pattern information is the potential for long-term optimization of data access patterns across system reboots or power cycles, leading to consistent performance improvements over time.

In some implementations, a machine learning (ML) component may be used to influence the SCL access pattern, among other examples. An ML component refers to hardware and/or software capable of performing ML. ML is a subset of artificial intelligence (AI) that involves the development of algorithms and statistical models enabling computers to perform tasks without explicit programming. ML leverages large datasets to identify patterns, make decisions, and improve over time based on experience. ML focuses on creating systems that can learn from data, adapt to new inputs, and generate predictions or actions.

For example, an ML component may be or include one or more ML models, ML algorithms, and/or ML systems including combinations of ML algorithms and ML models. An ML component may be implemented on any number of different hardware devices and may include one or more machine learning models. ML is a field of study that gives computers the ability to perform certain tasks without being explicitly programmed to perform those tasks. In traditional computing, a programmer would encode instructions (e.g., to solve a quadratic equation using the quadratic formula), and the computer would perform those exact instructions. In contrast, in ML, a computer can be provided with examples and be trained to perform a task such as prediction or classification, without the programmer encoding explicit instructions for the task. ML explores the study and construction of algorithms, also referred to herein as tools, models, and/or components, which may learn from existing data and make predictions about new data. Such ML tools operate by building a model from example training data in order to make data-driven predictions or decisions expressed as outputs or assessments. In some example embodiments, different ML models may be used. ML models may include, for example, K-means clustering models, linear regression models, Logistic Regression (LR) models, Naive-Bayes models, Random Forest (RF) regression models, gradient boost models, neural networks (NN), matrix factorization models, and/or Support Vector Machines (SVMs). Machine learning models may be implemented for use in a variety of use cases (e.g., language processing, image feature extraction, cyberthreat detection, or recommendation production), using a variety of approaches (e.g., supervised learning, unsupervised learning, or reinforcement learning), and in a variety of structures (e.g., a neural network, decision tree, linear regression, vector machine, Bayesian network, genetic algorithm, or deep learning system). Implementations herein may apply to any number of cache hierarchy levels which can be distributed across multiple chips in addition to different locations within a chip.

FIG. 1A is a diagram of an example computer system 100 described herein. The computer system 100 is illustrated as a multi-processor data processing system (MP) 100 that includes multiple processor chips 101 (each of which may function as a separate node of MP 100 and are labeled 101 a-101 n), memory 109, and input/output (I/O) device(s) 115. As is shown, I/O device(s) 115 have an associated I/O controller 113 and memory 109 has an associated memory controller 110 that controls access to and from memory 109. Processor chips 101 are connected to memory 109 and I/O devices 115 via interconnect (system bus) 111 by which processor chips 101 communicate with each other and with memory 109, I/O devices 115, and other peripheral devices. Interconnect 111 may be a bifurcated bus with a data bus for routing data and a separate address bus for routing address transactions and other operations. Processor chips 101 each include multiple (e.g., eight) processor cores 103, each of which may execute one or more threads 102 and have an associated L1 cache 105, an L2 cache 107, and an L3 cache 108. Each cache 105, 107, and 108 includes a cache directory and an array of cache lines. The caches 105, 107, and/or 108 may be shared caches. The caches 105, 107 and/or 108 may be physical or virtual caches.

An exemplary cache line may include multiple blocks/granules of data, corresponding to individual bytes, words, double words, etc., each of which may be the target of an update by a processor-issued store operation or the target of a processor-issued load operation. The specific size of each cache line and number of updateable data blocks/granules may differ from system to system.

Figure 1B:
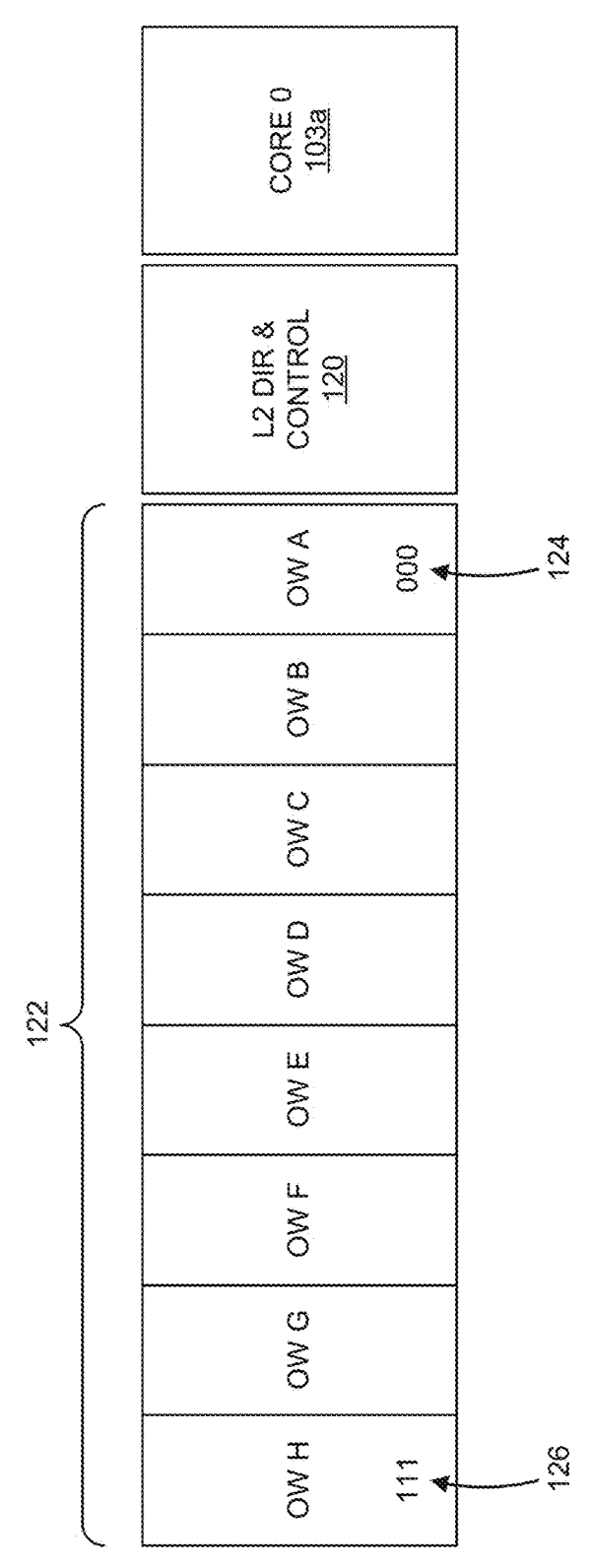
FIGS. 1B and 1C illustrate an example of an exemplary level 2 cache shown in FIG. 1A.
Figure 1C:
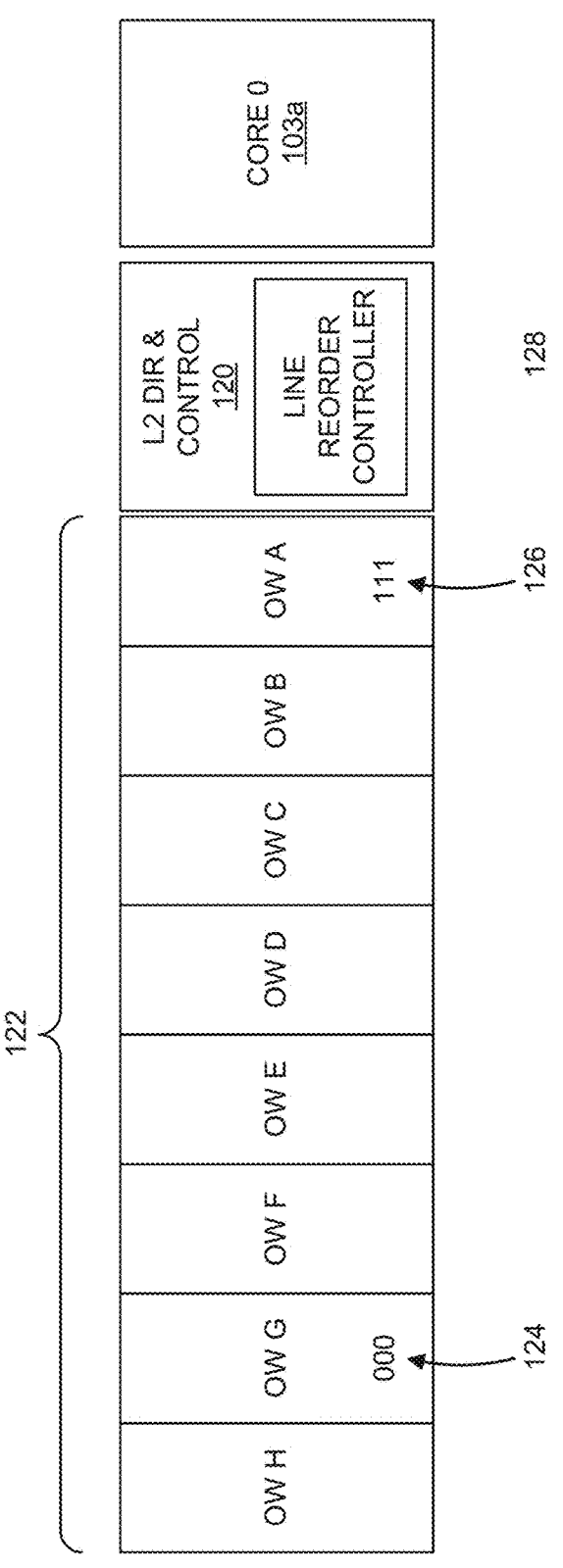

The hierarchical cache structure (L1, L2, L3) allows for efficient data access, with each level providing faster access but typically smaller capacity than the level below it. This structure helps balance processing speed with memory capacity. The multi-core, multi-thread architecture of the processor chips 101a-101n enables parallel processing, potentially improving overall system performance for multi-threaded applications or multiple simultaneous tasks FIGS. 1B and 1C illustrate an example of an exemplary level 2 cache 107a. FIG. 1B depicts the traditional organization of a cache line, while FIG. 1C shows the improved organization enabled by the disclosed sub cache line (SCL) position management technique.

In FIG. 1B, the L2 cache 107a contains a cache line 122 divided into eight octword positions, labeled "OW A" through "OW H." The octword positions may be referred to as "physical octwords." The cache line 122 is managed by an L2 directory and control unit 120. A processor core 103a is shown to the right of the L2 directory and control unit 120, indicating its connection to the cache system. The octword A position is closest to the processor core 103a, suggesting a potential for faster access to this portion of the cache line.

The layout in FIG. 1B illustrates a technical problem addressed by the disclosure. In traditional cache designs, the physical positions of octwords within a cache line may be fixed. This fixed ordering can lead to inefficiencies when the processor frequently accesses data stored in octwords that are physically farther from the core. For example, if the processor often needs to access data in octword H, it must wait longer for this data to be retrieved compared to data in octword A, potentially causing performance bottlenecks.

FIG. 1C illustrates the technical solution provided by this disclosure. The L2 cache 107a still contains a cache line 122 divided into octwords OW H through OW A. An addition in FIG. 1C is the line reorder controller 128 within the L2 directory and control module 120. This controller 128 may be configured to manage the reordering of data within the cache line based on access patterns. For example, the line reorder controller 128 may obtain SCL access pattern information associated with the set of SCLs (octwords in this case) of the cache line. Based on the SCL access pattern information, line reorder controller 128 may determine a predicted SCL access pattern and may, based on the predicted SCL access pattern, establish a physical position mapping of the SCLs within the cache line.

For example, if the SCL access pattern information indicates that the processor often uses octword 7 (binary 111), the line reorder controller 128 may reorder the octword physical positions such that octword 7 is now in position A, closest to the processor core. The physical position mapping established by the line reorder controller 128 effectively reorders the SCLs within the cache line. This reordering is performed based on the predicted access pattern, with the goal of placing frequently accessed SCLs in positions that can be accessed more quickly by the processor core, thereby potentially improving overall cache performance. When performing cache transactions, the system can take advantage of this reordering. For example, when returning data to the processor core, the system may choose between returning data in physical proximity order or in the requested order of SCLs, depending on the availability of fastpath bussing. This flexibility allows for optimized data access in various scenarios.

The SCL position management technique can be implemented in various ways. In some embodiments, the SCL access pattern information may be stored in an SCL table within the L2 directory and control module 120. Alternatively, it may be stored in the L2 cache directory itself, in a hardware data structure associated with the shared L2 cache, in a hardware data structure provided by the processor core, or even in software via the processor core.

The predicted SCL access pattern may be determined based on various factors, including but not limited to the frequency of SCL access, a prior access source (e.g., instruction cache, data cache, I/O, or accelerator), a current SCL target, prior persistence activity, or cache management hints. These hints could be software-directed or firmware-directed, allowing for flexible optimization strategies. As access patterns change over time, the line reorder controller 128 can adjust the SCL ordering accordingly. This dynamic adaptation may allow the cache to optimize its performance for changing workloads without requiring hardware modifications.

The disclosed technique can be applied to various types of cache systems beyond the specific L2 cache example shown. For instance, it could be implemented in L1 or L3 caches, or even in caches used in non-CPU contexts such as GPU memory systems or network routing caches. Additionally, the disclosed technique could be implemented in a traditional physical cache hierarchy or a virtualized cache hierarchy. The size and number of SCLs per cache line could also vary depending on the specific implementation. In some alternative embodiments, the SCL position management technique could be applied selectively to only certain cache lines, such as those identified as "hot" or frequently accessed. This could reduce the overhead of tracking and reordering all cache lines while still providing performance benefits for the most critical data.

While aspects of the present disclosure are described with specific reference to an L2 cache within a multi-level cache architecture, it should be understood that the disclosed embodiments may be implemented at a different cache level.

Implementations are described with reference to MP 100 and component parts of MP 100 illustrated by FIGS. 1A-1C, FIGS. 2A-2B, FIGS. 3A-3C, and FIGS. 4A-4F (described below), but may be applied to different configurations of data processing systems. As an example, some implementations may include a non-uniform memory access (NUMA) system, wherein the system memory (random access memory (RAM)) is divided among two or more memory arrays (having separate memory controllers connected to the system bus) and allocated among the processing units. Also, MP 100 could include new hardware components not shown in FIGS. 1A-1C, or have a novel interconnect architecture for existing components. MP 100 may also have a different number of processing units. Those skilled in the art will therefore appreciate that the present invention is not limited to the generalized system showing in FIGS. 1A-1C.

As indicated above, FIGS. 1A-1C are provided as examples. Other examples may differ from what is described with regard to FIGS. 1A-1C. The number and arrangement of devices shown in FIGS. 1A-1C are provided as an example. There may be additional components (e.g., a large number of components), fewer components, different components, or differently arranged components than those shown in FIGS. 1A-1C. Furthermore, two or more components shown in FIGS. 1A-1C may be implemented within a single device, or a single component shown in FIGS. 1A-1C may be implemented in multiple, distributed devices. Additionally, or alternatively, a set of components (e.g., one or more components) shown in FIGS. 1A-1C may perform one or more functions described as being performed by another set of components shown in FIGS. 1A-1C.

Figure 2A:
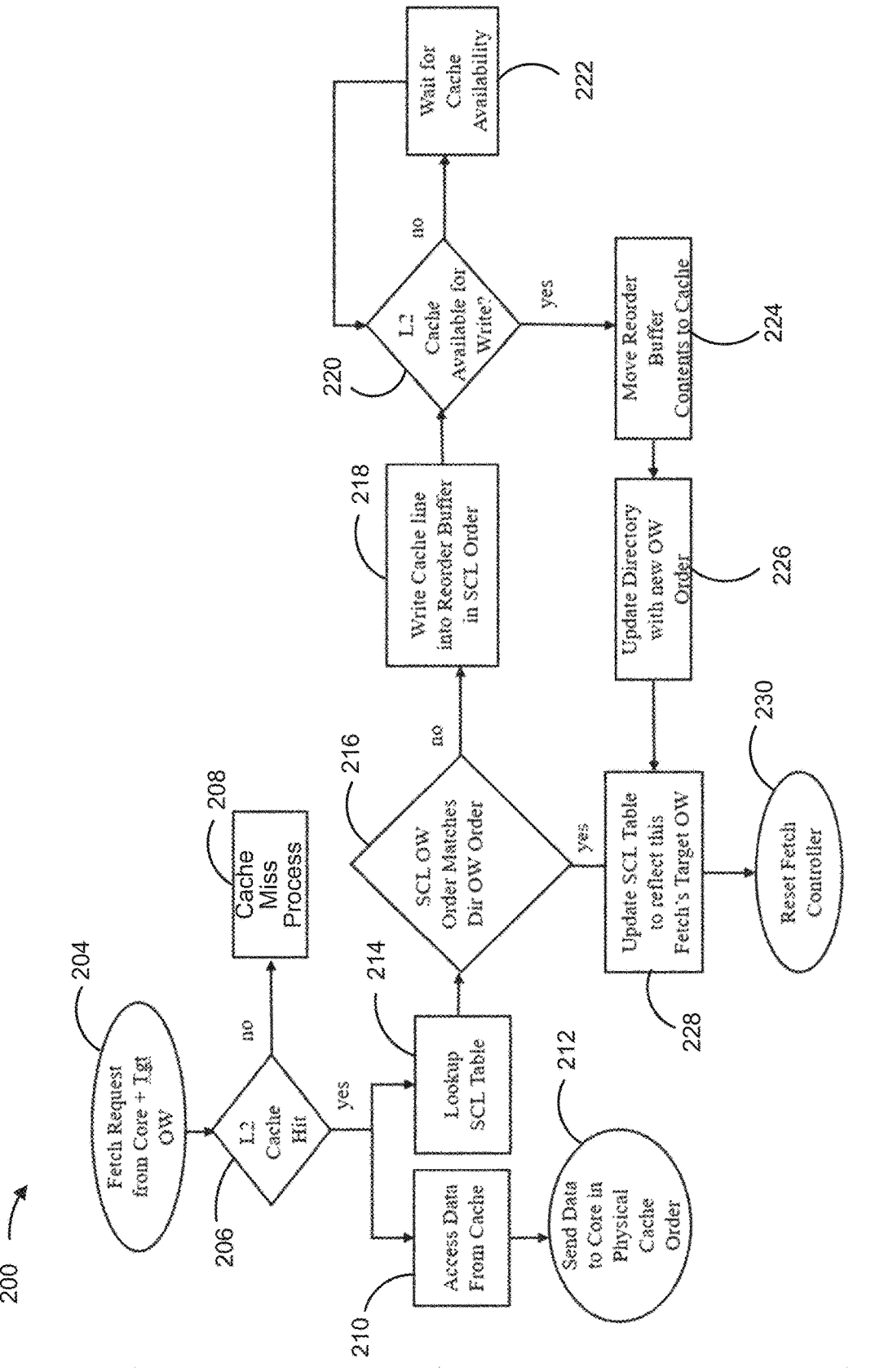
FIGS. 2A and 2B are flow diagrams showing examples of processes for sub cache line (SCL) position management.
Figure 2B:
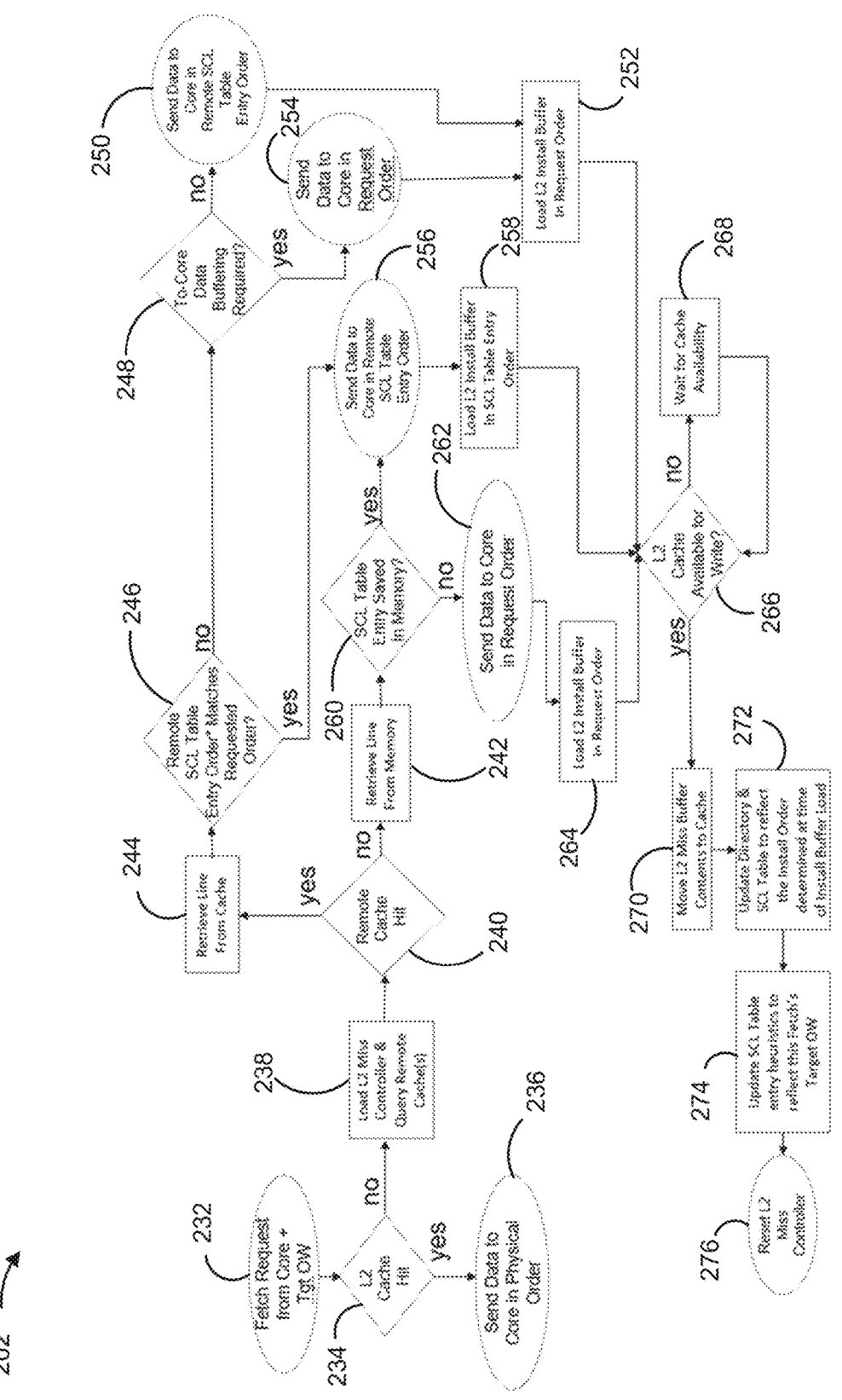

FIGS. 2A and 2B are flow diagrams showing examples of processes 200 and 202, respectively, for SCL position management, as described herein. The processes 200 and 202 may be performed by a computer system such as, for example, the computer system 100 shown in FIGS. 1A-1C.

The process 200 begins with receiving a fetch request from a core and target octword (OW), at 204. This step represents the initial trigger for the SCL position management technique disclosed herein. The fetch request may come from any processor core in a multi-core system, such as the processor cores 103a-103n shown in FIG. 1A. The target OW represents a specific subset of a cache line that the processor core is requesting to access.

At 206, the process 200 includes checking if there is an L2 cache hit. An L2 cache hit occurs when the requested data is found in the L2 cache, such as L2 cache 107a shown in FIG. 1B. If there is no hit (no branch from 206), a cache miss process is performed, as shown at 208 and as described below in further detail in connection with FIG. 2B. If there is an L2 cache hit (yes branch from 206), data is accessed from the cache, as shown at 210. At 212, the data is sent to the core in the physical cache order. This step represents the traditional method of returning cache data, where the physical layout of the cache determines the order in which data is sent to the requesting core. However, this disclosure introduces a technique to optimize this order based on access patterns.

At step 214, the process 200 includes looking up the SCL table. The SCL table, as described herein, stores information about the access patterns of different SCLs within cache lines. This table may be implemented in various ways, such as part of the L2 directory and control 120 shown in FIG. 1C, or as a separate data structure. At 216, the process 200 includes checking if the SCL OW (or other SCL) order matches the directory OW (or other SCL) order. The SCL OW order represents the order predicted by the SCL table based on past access patterns, while the directory OW order represents the current physical order of octwords in the cache line.

If the orders match (yes branch from 216), the process 200 includes updating the SCL table to reflect the fetch's target OW. This update ensures that the SCL table remains current with the latest access patterns. The SCL table may be updated using various heuristics, as described herein, including frequency of SCL access, prior access source, or current SCL target, among other examples.

If the orders do not match (no branch from 216), the process 200 includes writing the cache line into a reorder buffer in SCL order, as shown at 218. The reorder buffer, which may be implemented as part of the line reorder controller 128 shown in FIG. 1C, temporarily holds the reordered cache line data. This step begins the process of physically reordering the cache line subsets to match the predicted optimal order.

At 220, the process 200 includes checking if the L2 cache is available for write. This check is configured to ensure that the reordering process does not interfere with other ongoing cache operations. If the L2 cache is not available (no branch), the process 200 includes waiting for cache availability, at 222. This waiting step may involve various implementations, such as a simple delay or a more complex queuing system for managing multiple reorder requests. As shown by the arrow from 222 back to 220, the process 200 includes checking again if the L2 cache is available for write.

If the L2 cache is available (yes branch from 220), the process 200 includes moving the reorder buffer contents to the cache, at 224. This step physically reorders the octwords within the cache line, implementing the optimization predicted by the SCL table. The reordering may involve various hardware mechanisms, such as multiplexers or crossbar switches, to efficiently rearrange the data within the cache line. At 226, the directory is updated with the new OW order. This update ensures that the cache directory accurately reflects the new physical layout of the cache line. Implementations described herein are applicable to any granularity of a SCL. For example, the directory update may involve modifying fields such as the QLO (Quarter Line Order).

Following this, at 228, the SCL table is updated to reflect the fetch's target OW. This step may be performed regardless of whether reordering occurred, ensuring that the SCL table always contains the most up-to-date information about access patterns. The update may involve incrementing access counters, updating timestamps, or modifying other heuristic data used to predict future access patterns. At 230, the fetch controller is reset. This step prepares the system for the next fetch request, ensuring that all components are in a ready state. The fetch controller reset may involve clearing temporary registers, resetting state machines, or performing other cleanup operations necessary for proper functioning of the cache system.

FIG. 2B illustrates a flowchart of a process 202 for managing cache line access and reordering in the case of a cache miss. The process 202 begins at 232, where a fetch request from a core and target octword (OW) is received. This step is similar to step 204 in FIG. 2A, representing the initial trigger for the cache access process. At 234, the process 202 includes checking if there is an L2 cache hit. If there is a hit (yes branch), the process 202 includes sending data to the core in physical order, as shown at 236 and as described in connection with FIG. 2A above. If there is no L2 cache hit (no branch from 234), the process 202 includes activating a load L2 miss controller and querying remote cache(s), as shown at 238. The load L2 miss controller may be implemented as part of the L2 directory and control 120 shown in FIG. 1C. Remote caches may include higher-level caches such as L3 caches 108a-108n shown in FIG. 1A, or caches in other processor chips in a multi-chip system.

At 240, the process 202 includes checking if there is a remote cache hit. This step includes determining whether the requested data is found in one of the queried remote caches. If there is no remote cache hit (no branch from 240), the process 202 includes retrieving a line from memory, as shown at 242. This memory access represents the highest latency operation in the cache hierarchy and may involve accessing main memory 109 shown in FIG. 1A. If there is a remote cache hit (yes branch from 240), the process 202 includes retrieving a line from the cache, as shown at 244.

This step involves transferring the cache line from the remote cache to the local L2 cache.

At 246, the process 202 includes checking if the remote SCL table entry order matches the requested order. This step may be configured for determining whether the data retrieved from the remote cache is already in the optimal order for the requesting core. The remote SCL table entry order may be stored and transferred along with the cache line data, as described herein. If the remote SCL table entry order does not match the requested order (no branch from 246), the process 202 includes checking if to-core data buffering is required, as shown at 248. This check facilitates determining whether the data can be sent directly to the core or if it needs to be temporarily stored in a buffer. The need for buffering may depend on various factors such as core readiness, bus availability, or the specific architecture of the cache-to-core interface.

If to-core buffering is not required (no branch from 248), the process 202 includes sending the data to the core in the remote SCL table entry order, as shown at 250. Then, the L2 install buffer is loaded in the requested order, as shown at 252. If to-core buffering is required (yes branch from 248), the data is sent to the core in the request order, at 254, and the L2 install buffer is loaded in the requested order, as shown at 252. If the remote SCL table entry order matches (yes branch from 246), the process 202 includes sending the data to the cord in the remote SCL table entry order, as shown at 256.

After retrieving the line from memory in step 242, the process 202 includes determining if the SCL table entry is saved in memory, as shown at 260. This check determines whether the access pattern information for this cache line is persisted in main memory. Persisting SCL table entries in memory allows for long-term optimization of access patterns, even once lines have aged out of all cache levels or, if non-volitile memory technology is used, across system reboots or power cycles.

If the SCL table entry is saved in memory (yes branch from 260), the process 202 includes sending the data to the core in the remote SCL table entry order, at 256. This step utilizes the persisted access pattern information to potentially optimize the data transfer to the core. At 258, the process 202 includes loading the L2 install buffer in the SCL table entry order. If the SCL table entry is not saved in memory (no branch from 260), the data is sent to the core in the request order, as shown at 262. This step represents the default case where no historical access pattern information is available. At 264, the L2 install buffer is loaded in the request order. The different install orders described above allow for flexibility in optimizing the cache line layout based on various factors such as the source of the data (memory or remote cache) and the availability of access pattern information.

In all of the above cases, the process 202 then includes determining whether the L2 cache is available for write, as shown at 266. This check is similar to step 220 in FIG. 2A, ensuring that the cache is ready to receive the new or updated cache line. If the L2 cache is not available (no branch from 266), the process 202 includes wait for cache availability, as shown at 268. If the L2 cache is available (yes branch from 266), the process 202 includes moving the L2 miss buffer contents to the cache, as shown at 270. This step physically installs the new or updated cache line into the L2 cache, potentially in a reordered configuration based on the predicted optimal access pattern. The process 202 then includes updating the directory and SCL table to reflect the install order, as shown at 272. This step ensures that both the cache directory and the SCL table accurately represent the new state of the cache line, including its physical layout and access pattern information.

At 274, the SCL table entry heuristics are updated to reflect the fetch's target OW. This step fine-tunes the access pattern prediction based on the most recent fetch operation. The heuristics may include various factors as described in the invention disclosure form, such as frequency of access, prior access source, and current SCL target. At 276, the L2 miss controller is reset. This step prepares the system for handling the next cache miss, ensuring that all components are in a ready state for future operations.

The processes 200 and 202 described in FIGS. 2A and 2B represent a comprehensive approach to SCL position management in cache systems. These processes implement aspects of the disclosure, including obtaining SCL access pattern information, determining predicted SCL access patterns, establishing physical position mappings of SCLs within cache lines, and performing cache transactions in accordance with these mappings. The processes may allow for dynamic optimization of cache line subset ordering based on observed access patterns, potentially improving overall cache performance by reducing average access latency for frequently accessed data subsets.

As indicated above, FIGS. 2A and 2B are provided as examples. Other examples may differ from what is described with regard to FIGS. 2A and 2B. The number and arrangement of operations shown in FIGS. 2A and 2B are provided as an example. There may be additional operations, fewer operations, different operations, or differently arranged operations than those shown in FIGS. 2A and 2B. Furthermore, two or more operations shown in FIGS. 2A and 2B may be implemented within a single operation, or a single operation shown in FIGS. 2A and 2B may be implemented as multiple operations.

Figure 3A:
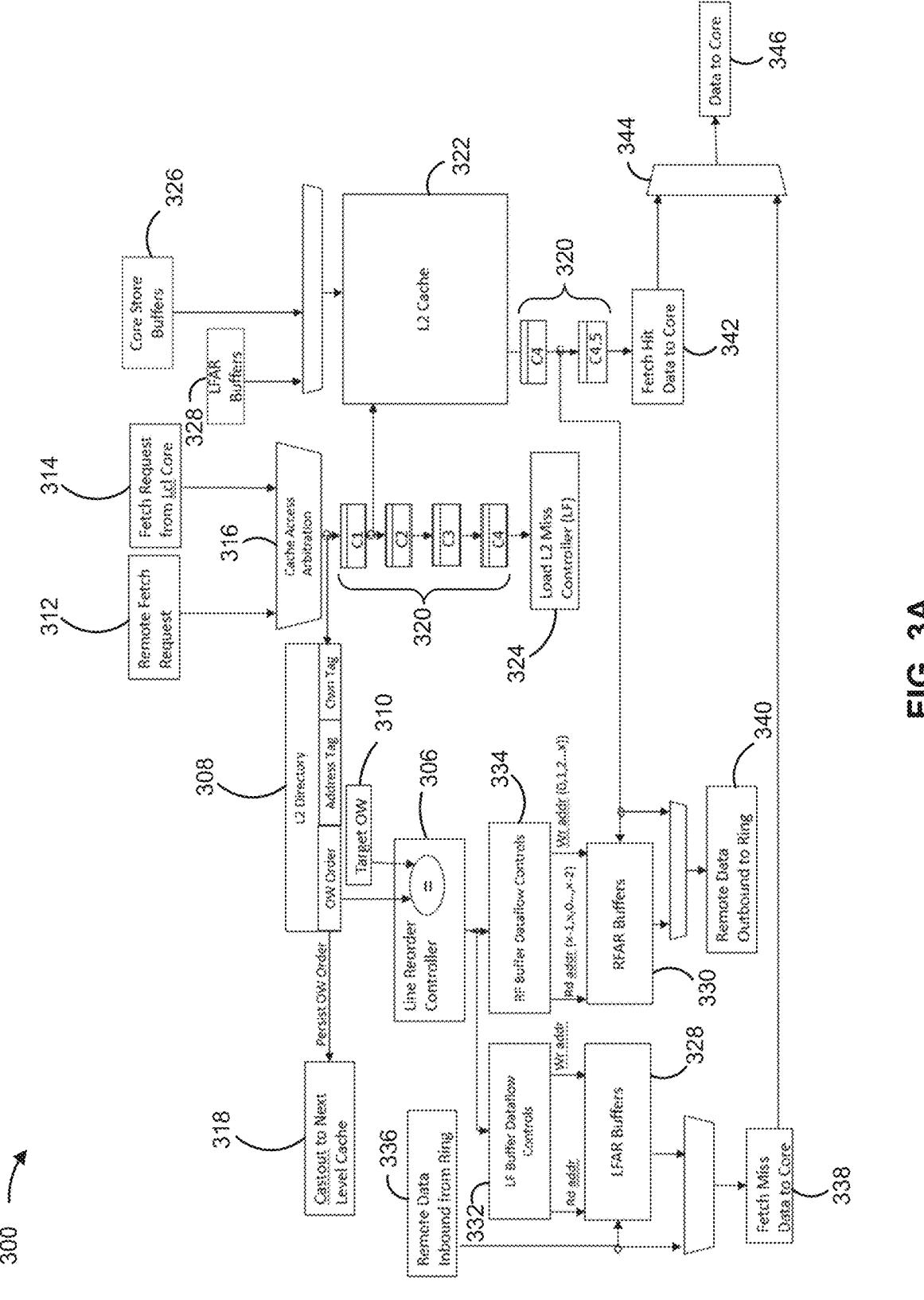
FIGS. 3A-3C are schematic block diagrams showing examples associated with SCL position management.
Figure 3B:
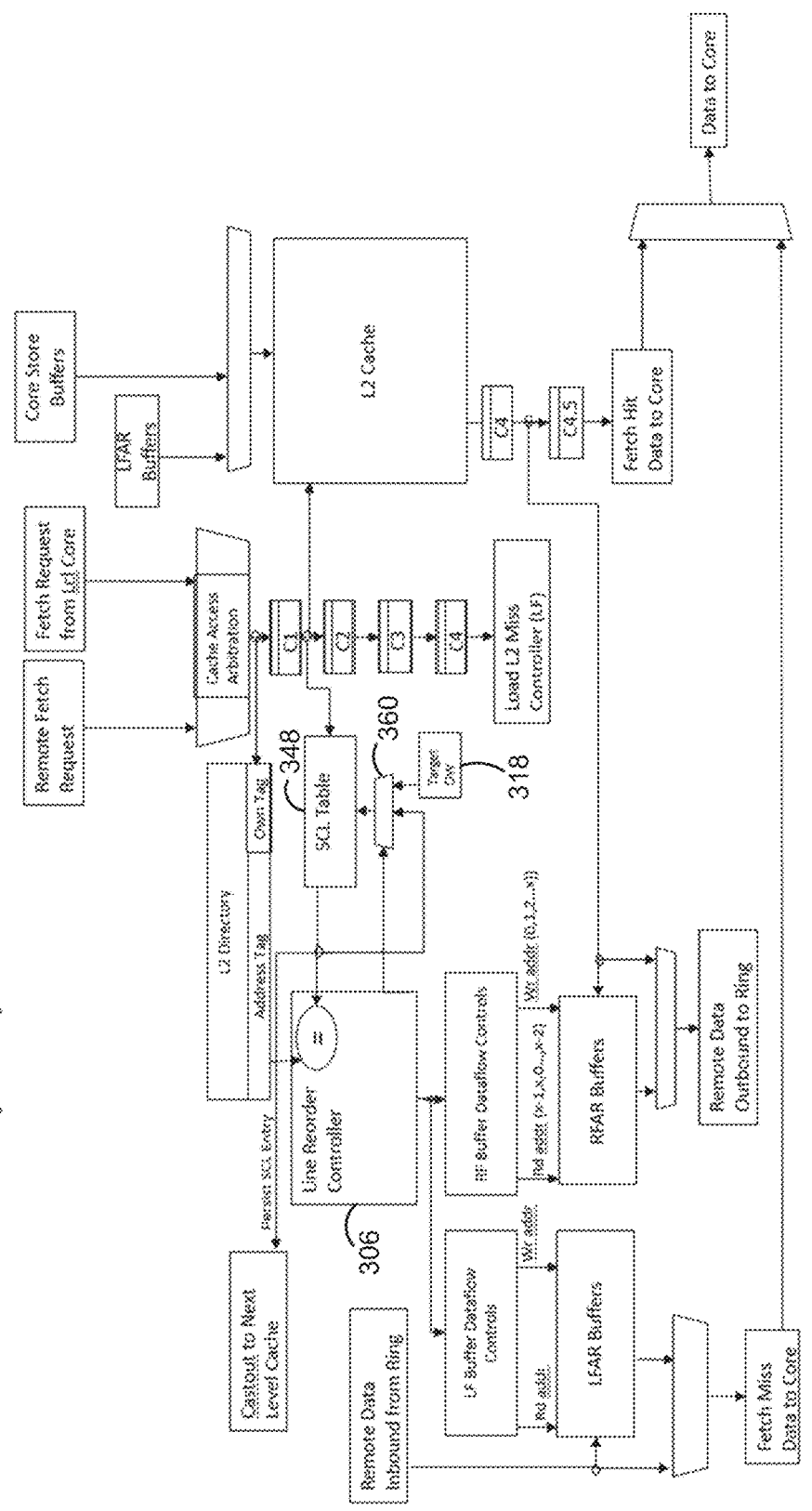
Figure 3C:
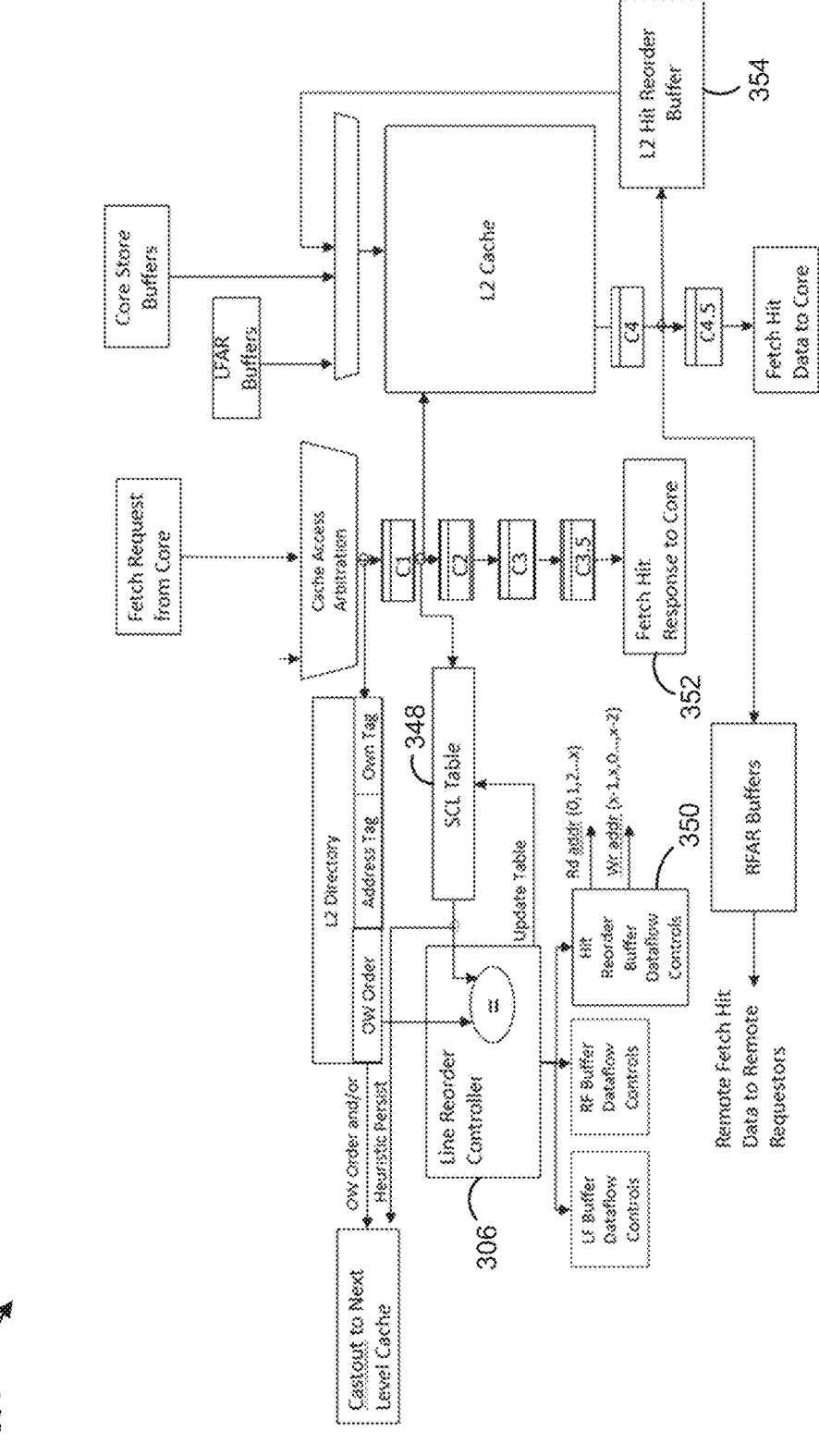

FIGS. 3A-3C are schematic block diagrams showing examples 300, 302, and 304 associated with SCL position management, as described herein. The examples 300, 302, and 304 may be implemented in a computer system such as, for example, the computer system 100 shown in FIGS. 1A-1C. Any one or more of the examples 300, 302, and 304 may correspond to one or more aspects of the example 200 and 202 shown in FIGS. 2A and 2B. In examples 300, 302, and 304, the system may include a line reorder controller 306. The line reorder controller 306 may be connected to the L2 directory 308.

The line reorder controller 306 may be configured to process target OW 310 information and can potentially reorder cache lines based on access patterns. For example, the line reorder controller 306 may reorder SCLs such as OWs based on SCL access pattern information. As described herein, the line reorder controller 306 may implement various algorithms to predict future access patterns, such as frequency-based prediction, temporal locality analysis, or more advanced machine learning techniques. In some embodiments, the line reorder controller 306 may also consider software hints or firmware directives when making reordering decisions.

The SCL access pattern information, heuristics associated with the SCL access pattern information, and/or an SCL order (e.g., an OW order) may be stored in the L2 directory 308, as shown in example 300. The L2 directory 308 also may store additional information about cache lines, including an address tag and ownership tag. The L2 directory 308 may be implemented as a separate memory structure or integrated into the cache itself. In some embodiments, the L2 directory 308 may include additional fields to support the SCL position management technique, such as an Octword (OW) Order or Quarter Line Order (QLO) field.

In example 300, the system receives input from two sources: a remote fetch request 312 and a fetch request from local core 314. The remote fetch request 312 may originate from another processor chip or a remote device, while the fetch request from local core 314 comes from a processor core on the same chip. These requests are processed through a cache access arbitration 316 module, which manages access to the cache system. The cache access arbitration module 316 may use various algorithms to prioritize and schedule cache access requests, such as round-robin, priority-based, or more complex schemes based on current system load and request urgency.

A castout 318 mechanism is shown, which handles data transfer to the next level cache and persists the OW order. The castout 318 mechanism may perform various processes including writing modified cache lines back to higher-level caches or main memory, while maintaining the optimized SCL ordering. This persistence of SCL ordering across cache levels may allow for long-term optimization of data access patterns.

The system includes a cache access pipeline with multiple pipeline stages 320 (C1, C2, C3, C4). This pipeline feeds into the L2 cache 322, which is the main storage component of the system. The pipeline stages 320 may include address generation, directory lookup, data fetch, and data alignment operations. In various implementations, the number and specific functions of pipeline stages may vary depending on the cache architecture and performance requirements.

For handling cache misses, a load L2 miss controller 324 may be implemented. This controller 324 manages the process when requested data is not found in the L2 cache. The load L2 miss controller 324 may initiate requests to higher-level caches or main memory, and coordinate the installation of new data into the L2 cache. In some implementations, the load L2 miss controller 324 may also be responsible for applying the SCL reordering technique when bringing new data into the cache.

The system incorporates several buffer components to manage data flow. For example, core store buffers 326 may be configured for storing data from the core. Local fetch address request (LFAR) buffers 328 may buffer local fetch address requests and remote fetch address request (RFAR) buffers 330 may buffer remote fetch address requests. These buffers help decouple different stages of the cache access process, allowing for improved parallelism and performance. The specific sizes and management policies for these buffers may vary depending on the system requirements and available resources.

Data flow in the system may be managed by local fetch (LF) buffer dataflow controls 332 and remote fetch (RF) buffer dataflow controls 334. These controls may direct data movement between various components, ensuring efficient utilization of system resources and minimizing data transfer latencies. The dataflow controls 332 and 334 may implement complex routing algorithms to optimize data movement based on current system conditions and predicted access patterns.

The LF buffer dataflow controls 332 and RF buffer dataflow controls 334 may work in conjunction with read (Rd) and write (Wr) addresses to efficiently manage data flow between various components of the cache hierarchy. The LF buffer dataflow controls 332 may manage local fetch operations, coordinating data movement between the local core, L2 cache, and other local cache levels. These controls may use Rd addr (read address) information to retrieve data from the appropriate cache location or memory address. The Rd addr may be used to index into the cache or memory, allowing the system to locate and fetch the requested data efficiently.

Similarly, the RF buffer dataflow controls 334 may handle remote fetch operations, managing data movement between the local cache system and remote components such as other processor cores or memory controllers. These controls may use both Rd addr and Wr addr (write address) information to manage data transfer. The Rd addr may be used when fetching data from remote sources, while the Wr addr may be used when storing fetched data in the local cache or when writing data back to remote locations.

In some implementations, the LF and RF buffer dataflow controls may work together to optimize data movement. For example, when a local fetch operation results in a cache miss, the LF buffer dataflow controls 332 may coordinate with the RF buffer dataflow controls 334 to fetch the required data from a remote source. The Rd addr may be used to locate the data in the remote source, while the Wr addr may be used to determine where to store the fetched data in the local cache.

These dataflow controls may also interact with the line reorder controller 306 to implement the SCL position management technique. When reordering cache line subsets, the dataflow controls may use modified Rd addr and Wr addr values to reflect the new positions of the reordered data within the cache. This may allow the system to maintain efficient access to the reordered data, potentially improving overall cache performance.

Remote data inbound from a ring 336 refers to data that is received from other components or nodes in a multiprocessor or distributed system, typically through a ring-based interconnect. Implementations described herein may not require a bring-based interconnect, any other remote connectivity portal would work similarly. This data may originate from remote caches, memory controllers, or other processing units. The management of remote data inbound involves several steps and components within the cache system. When remote data arrives, it may be temporarily stored in LFAR buffers 328. These buffers act as staging areas for incoming data, allowing the system to handle multiple requests concurrently. The LF buffer dataflow controls 332 may then manage the movement of this data through the cache hierarchy. In some cases, the incoming remote data may need to be reordered or processed by the line reorder controller 306 before being installed in the L2 cache 322. This reordering may be based on predicted access patterns or other optimization criteria. The system may also update the L2 directory 308 and SCL table to reflect the new data and its organization within the cache. In some cases, the remote data inbound from the ring 336 may be fetch miss data, which may be sent to the core, at 338.

As shown, fetch hit data from the L2 cache may be retrieved from the cache using cache access pipeline 320 stages C4 and C4.5. The fetch hit data can be sent out through remote data outbound 340, allowing for efficient communication with other parts of the system or external devices. The fetch hit data may be sent to the core, as shown at 342. In some implementations, a data multiplexer 344 may combine data from different sources before sending it to the core, as shown at 346. This multiplexer 344 allows for flexible data routing, potentially implementing the SCL reordering technique by selecting data in the optimized order.

FIG. 3B illustrates a schematic diagram of an example 302 associated with SCL position management. This example 302 is similar to example 300, shown in FIG. 3A, but includes a separate SCL table 348 that is not stored in the L2 directory. The line reorder controller 306 may be configured to make decisions about cache line subset reordering based on historical access patterns and predicted future accesses. The SCL table 348 stores access pattern information for cache lines. The SCL table 348 may include fields such as access frequency, last access time, access source (e.g., instruction cache, data cache, I/O), target OW 310 information, or other relevant metadata, among other examples. The structure of the SCL table 348 may vary depending on the specific implementation, balancing the trade-offs between storage overhead and the granularity of access pattern tracking.

FIG. 3C provides a more detailed example 304 of the cache hit scenario, in which an SCL table 348 is employed, as shown also in FIG. 3B. As is further shown in the example 304, hit reorder buffer dataflow controls 350 may be implemented and may manage the reordering of data during cache hit scenarios. These controls 350 may implement various policies to balance the benefits of reordering against the potential latency costs.

The example 304 also includes a fetch hit response 352, representing the initial response to a cache hit before any reordering takes place. This component may include logic to quickly determine whether reordering is necessary or beneficial for the current access. An L2 hit reorder buffer 354 may be a temporary storage area for holding cache line data while it is being reordered. The size and management policy of this buffer may vary depending on system requirements and available resources.

The components and processes illustrated in FIGS. 3A-3C work together to implement aspects of SCL position management techniques described herein. By dynamically reordering cache line subsets based on observed and predicted access patterns, various implementations may reduce average cache access latency and improve overall system performance. The flexibility of the design allows for various implementations and optimizations tailored to specific system requirements and workload characteristics.

As indicated above, FIGS. 3A-3C are provided as examples. Other examples may differ from what is described with regard to FIGS. 3A-3C. There may be additional components (e.g., a large number of components), fewer components, different components, or differently arranged components than those shown in FIGS. 3A-3C. Furthermore, two or more components shown in FIGS. 3A-3C may be implemented within a single device, or a single component shown in FIGS. 3A-3C may be implemented in multiple, distributed devices. Additionally, or alternatively, a set of components (e.g., one or more components) shown in FIGS. 3A-3C may perform one or more functions described as being performed by another set of components shown in FIGS. 3A-3C.

FIGS. 4A-4G are schematic diagrams showing examples associated with SCL position management, as described herein. The examples of FIGS. 4A-4G may be implemented in a computer system such as, for example, the computer system 100 shown in FIGS. 1A-1C. The examples of FIGS. 4A-4G may be implemented in accordance with one or more aspects of the operations shown in FIGS. 2A and 2B and/or in accordance with one or more components of the examples shown in FIGS. 3A-3C.

Figure 4A:
FIGS. 4A-4G are schematic diagrams showing examples associated with SCL position management.

FIG. 4A shows an example 400 of a cache memory system with a 256 byte line size and quarter line (QL)) reordering capabilities. The system comprises a directory 402 and a cache 404. The directory 402 contains a QLO (Quarter Line Order) field, which in this example is set to '01'b. This QLO value determines the ordering of the four quarter lines within the cache line. The QLO field is a component of the SCL position management technique, allowing the system to track and modify the physical positions of cache line subsets based on access patterns.

The cache 404 is represented as a table with two rows. The top row shows the content or logical OW numbers, ranging from 2 to 1. The bottom row displays the physical OW location, ranging from 0 to 7. This representation illustrates how the logical OW numbers can be mapped to different physical locations within the cache line, enabling the system to optimize data access based on predicted usage patterns.

A table at the bottom of FIG. 4A provides information on different QLO values and their corresponding line boundary wrap OW order and zero origin wrap order. This table shows four different QLO values ('00'b, '01'b, '10'b, '11'b) and their respective OW orderings. The inclusion of multiple ordering schemes demonstrates the flexibility of the SCL position management technique, allowing it to adapt to various access patterns and system requirements.

The example in FIG. 4A demonstrates a line boundary wrap case where QLO='01'b. In this configuration, the physical OW0 slot contains logical OW2, while the physical OW1,2,3,4,5,6,7 slots contain logical OW3,4,5,6,7,0,1 respectively. This reordering allows for optimized access to frequently used octwords by placing them in more accessible positions within the cache line. Alternative embodiments may use different QLO encodings or wrap schemes to suit specific system architectures or workload characteristics.

Figure 4B:
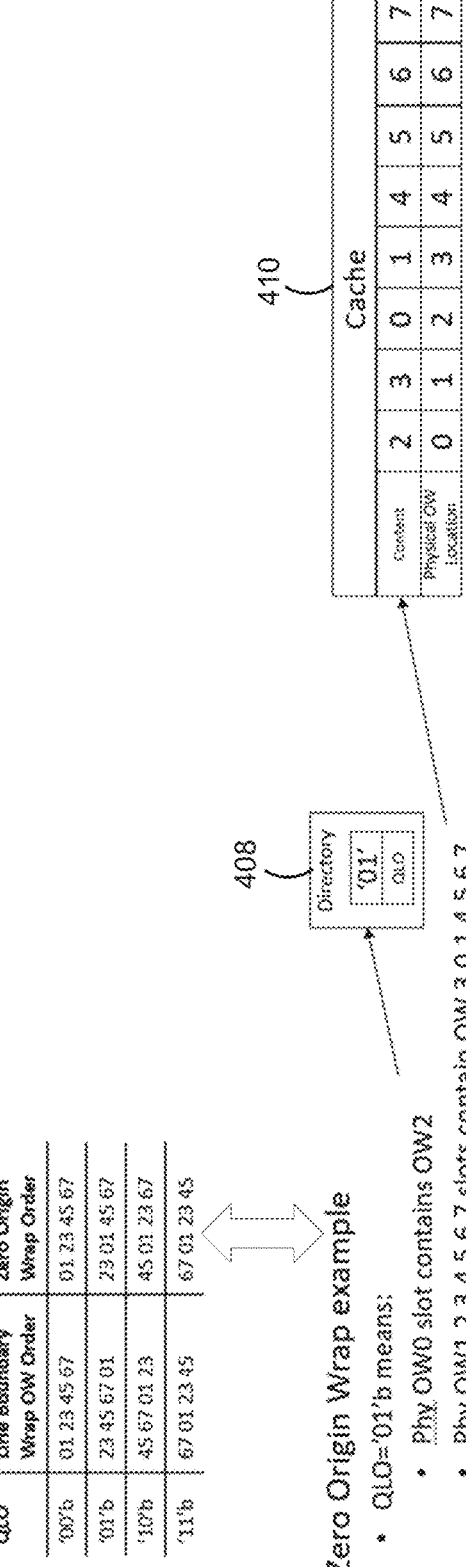

FIG. 4B illustrates a system diagram of an example 406 for managing cache line subsets based on OW ordering. The system comprises three main components: a QLO table, a directory 408, and a cache 410. The QLO table at the top of the diagram shows different OW ordering schemes, including "Line Boundary Wrap OW Order" and "Zero Origin Wrap Order" for various QLO values. The directory 408 is shown as a small box containing the QLO value '01'. This directory 408 is connected to the cache 410, indicating that it provides information about the OW ordering to the cache. The directory 408 may be implemented as part of a larger cache directory structure or as a separate data structure dedicated to SCL position management.

The cache 410 is represented as a table with two rows, showing the content (OW numbers 2,3,0,1,4,5,6,7) and the physical OW location (0,1,2,3,4,5,6,7). This arrangement in the cache 410 corresponds to the zero origin wrap example described in the QLO table, where OW2 is in the first physical position. The cache 410 may be implemented using various memory technologies, such as SRAM or eDRAM, depending on the specific requirements of the system.

Figure 4C:
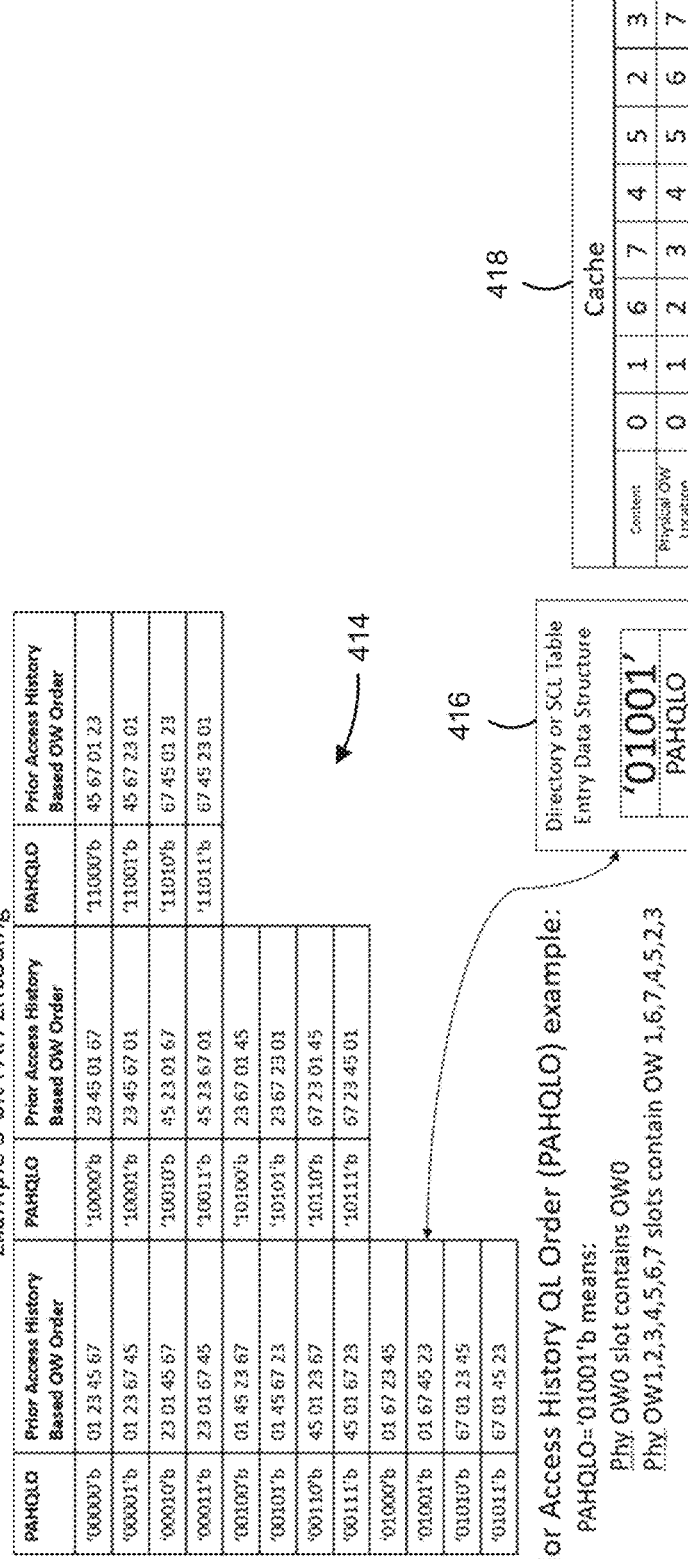

FIG. 4C illustrates an example 412 of a system for managing cache line subsets based on prior access history. The system comprises a table 414, a directory 416, and a cache 418. The table 414 shows an example of 5-bit Prior Access History (PAH) Encoding, containing multiple entries with PAHQLO (Prior Access History Quarter Line Order) codes and corresponding Prior Access History Based OW Orders.

The directory 416 is labeled as "Directory or SCL Table Entry Data Structure" and contains an entry '01001' which represents the PAHQLO code. This code corresponds to a specific octword ordering as shown in the table 414. The directory 416 may be implemented as part of the cache directory or as a separate data structure, potentially using content-addressable memory (CAM) for fast lookups.

The cache 418 is represented as a grid showing the physical layout of octwords, with rows for "Content" and "Physical OW Location". The cache 418 demonstrates how the octwords are physically arranged based on the PAHQLO code from the directory 416. This arrangement allows for optimization of cache access based on historical access patterns, potentially reducing average access latency for frequently accessed data subsets.

Figure 4D:
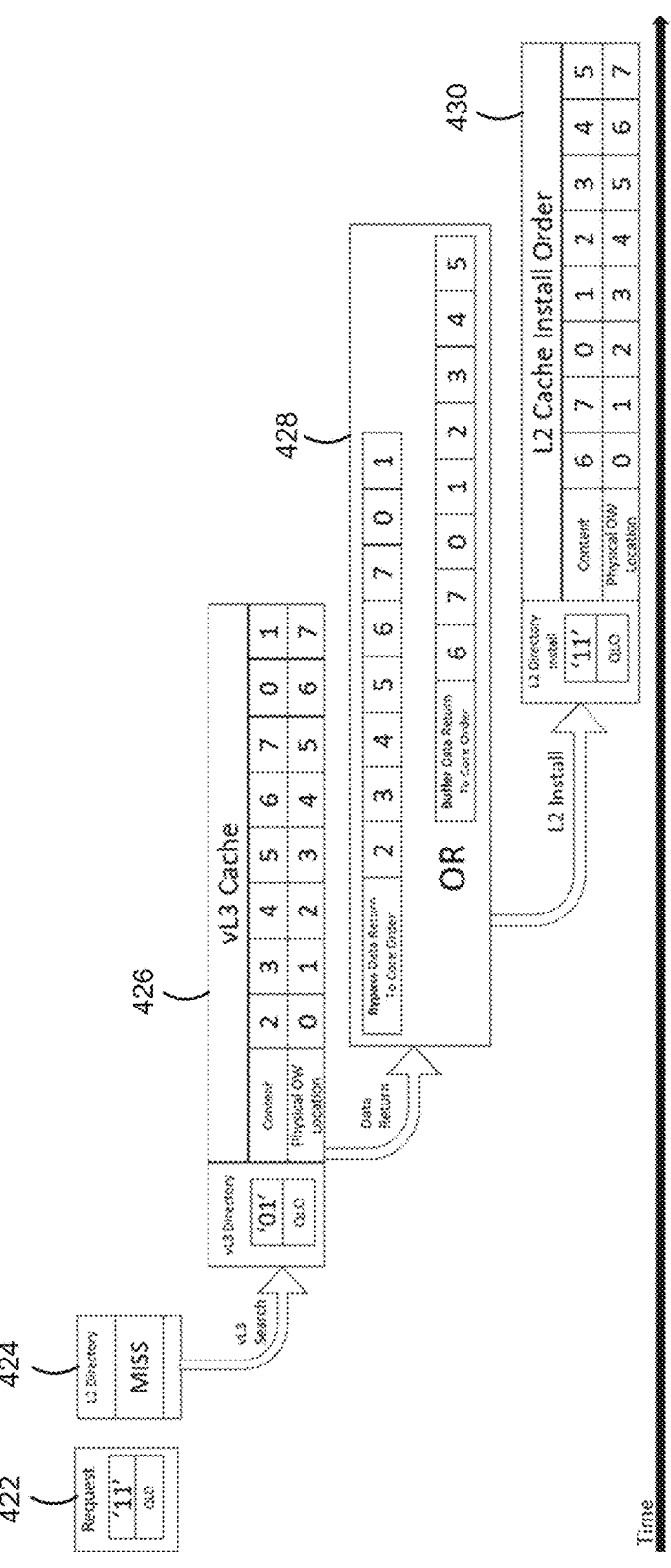

FIG. 4D illustrates an install management example 420 for a multi-level virtual cache system. The process begins with a Request 422 that has a QLO of '11'. This request is sent to the L2 Directory 424, which results in a MISS. Following the L2 cache miss, a virtual L3 (vL3) search is initiated to locate the requested data in the vL3 Cache 426. The vL3 Directory shows a QLO of '01', indicating a different order than the request. The vL3 Cache 426 contains the content in the order 2, 3, 4, 5, 6, 7, 0, 1, with corresponding physical OW locations of 0, 1, 2, 3, 4, 5, 6, 7. This mismatch between the requested QLO and the vL3 QLO demonstrates how the SCL position management technique can adapt to different orderings at various cache levels.

The data return options 428 are then presented, showing two possible paths for data return to the core: a Bypass Data Return To Core Order, which maintains the vL3 Cache order, and a Buffer Data Return To Core Order, which reorders the data to 6, 7, 0, 1, 2, 3, 4, 5. These options allow the system to balance the benefits of reordering against potential latency costs, depending on the availability of fastpath bussing. The L2 Cache Install Order 430 shows how the data is installed in the L2 cache. The L2 Directory Install updates the QLO to '11' to match the original request, and the content is installed in the order 6, 7, 0, 1, 2, 3, 4, 5. This reordering aligns the cache line subsets with the requested order, potentially optimizing future accesses.

Figure 4E:
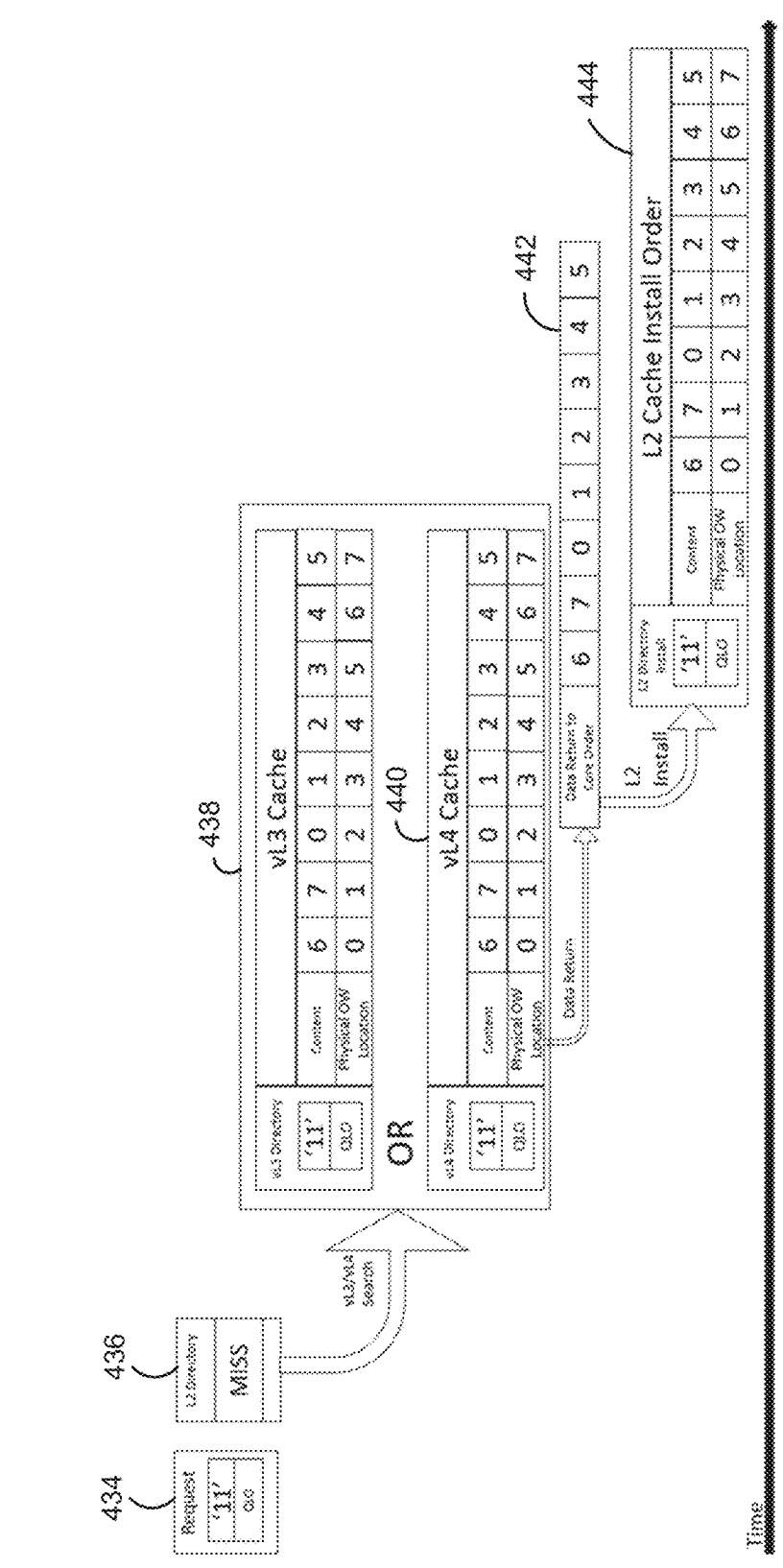

FIG. 4E illustrates another install management example 432 for a multi-level cache system. The example begins with a request 434, which includes a QLO value of '11'. This request is checked against the L2 directory 436, resulting in a cache miss. Upon the L2 miss, the system initiates a search in the higher-level caches. The diagram shows two possible scenarios: a hit in the vL3 cache 438 or the vL4 cache 440. Both caches are represented with their respective directories and content layouts, demonstrating how the SCL position management technique can be applied across multiple cache levels.

After retrieving the data from either the vL3 cache 438 or vL4 cache 440, the system determines the data return to core order 442. This order represents how the data will be sent back to the requesting core, with the octwords arranged in a specific sequence (6, 7, 0, 1, 2, 3, 4, 5). The ability to reorder data during the return process allows the system to optimize data delivery based on the current request and predicted future access patterns. The L2 cache install order 444 is shown at the bottom of the diagram. This represents how the data will be installed in the L2 cache after retrieval from the higher-level caches. The L2 cache install order 444 maintains the same arrangement as the data return to core order 442, ensuring consistency between the data sent to the core and the data stored in the L2 cache. This consistency can help improve the effectiveness of future cache accesses.

Figure 4F:
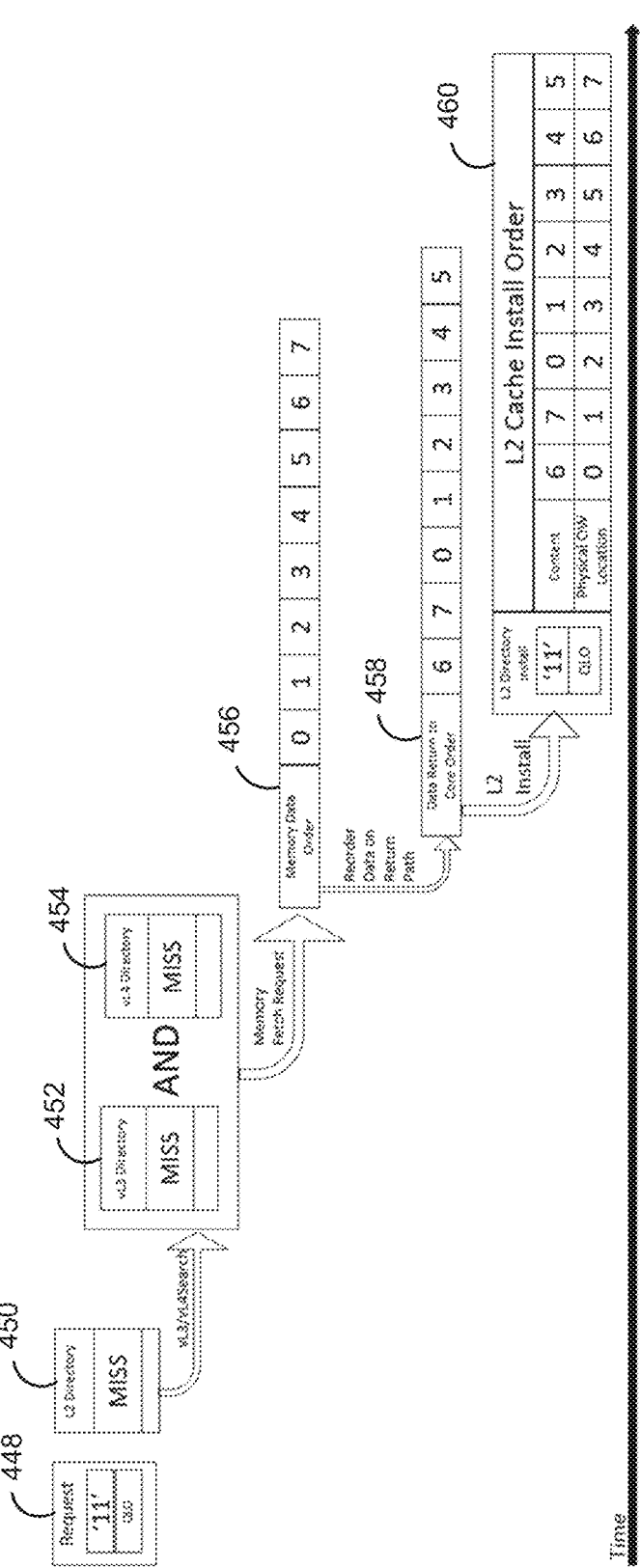

FIG. 4F illustrates a final install management example 446 for a multi-level cache system. The process begins with a Request 448 for data with a QLO of '11'. This request is checked against the L2 Directory 450, vL3 Directory 452, and vL4 Directory 454, all resulting in misses. The combination of misses in all cache levels triggers a Memory Fetch Request. The Memory Data Order 456 shows the original order of data in memory, represented as octwords 0 through 7. Upon retrieval from memory, the data undergoes a reordering process on the return path. This reordering is based on the initial request's QLO, demonstrating how the SCL position management technique can be applied even to data fetched from main memory. The Data Return to Core Order 458 shows the reordered sequence of octwords: 6, 7, 0, 1, 2, 3, 4, 5. This reordering process places the requested data (indicated by the QLO '11', which corresponds to octwords 6 and 7) at the beginning of the sequence, optimizing it for the core's immediate use. The ability to reorder data during the return process, even for memory fetches, highlights the flexibility and potential performance benefits of the SCL position management technique. Finally, the memory sourced data is installed in the L2 Cache. The L2 Cache Install Order 460 shows both the content order and the physical QW (Quarter Word) location. The content is installed in the reordered sequence (6, 7, 0, 1, 2, 3, 4, 5), while the physical locations maintain their original order (0, 1, 2, 3, 4, 5, 6, 7). This installation process updates the L2 Directory with the new QLO '11', reflecting the reordered state of the cache line.

The SCL position management techniques described in FIGS. 4A-4F provide flexible and efficient solutions to the problem of fixed cache line subset ordering. By dynamically adapting to observed access patterns, some implementations may significantly improve cache performance in a wide range of computing systems. Various embodiments may include variations in the number of bits used for QLO encoding, different reordering algorithms, or application of the technique to different types of cache architectures, such as non-uniform cache access (NUCA) designs or software-managed caches.

Figure 4G:
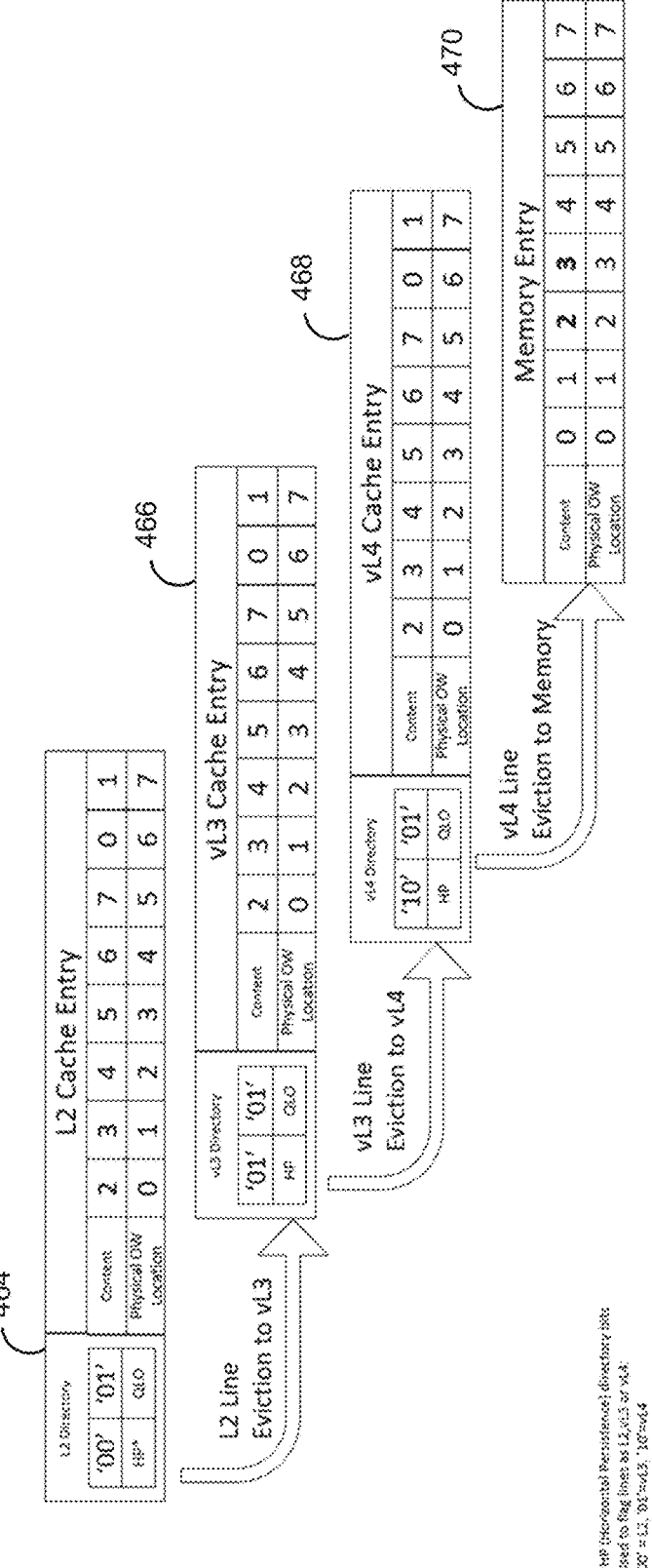

FIG. 4G illustrates an eviction management example 462 for a multi-level cache system implementing SCL position management as described in this disclosure. The system comprises several components representing different levels of cache and memory hierarchy, each maintaining SCL access pattern information to optimize cache performance.

The L2 directory and cache entry 464 is shown at the top of the diagram. It includes an L2 directory with fields for HP (Horizontal Persistence) and QLO (Quarter Line Order), as well as an L2 Cache Entry containing content and physical OW (Octword) location information. The L2 Cache Entry is divided into 8 sections, numbered 0 through 7, representing the SCLs within the cache line. The QLO field in the L2 directory stores the current ordering of SCLs, which may be determined based on predicted access patterns. For example, the QLO field might use a 2-bit encoding to represent four possible orderings, or a more complex 5-bit encoding for up to 32 different orderings. Alternative embodiments may use different bit widths for the QLO field, balancing the trade-off between flexibility in reordering and storage overhead.

Below the L2 directory and cache entry 464 is the vL3 directory and cache entry 466. This component is connected to the L2 level via an "L2 Line Eviction to vL3" arrow, indicating the flow of data when evicted from L2. The vL3 directory includes HP and QLO fields, and the vL3 Cache Entry is structured similarly to the L2 Cache Entry. When a cache line is evicted from L2 to vL3, the SCL access pattern information, encoded in the QLO field, is persisted. This persistence allows the system to maintain optimized SCL orderings even as data moves between cache levels. In some embodiments, additional heuristic information may be transferred along with the QLO, such as access frequency counters or timestamps, to provide more context for future reordering decisions.

The vL4 directory and cache entry 468 is positioned below the vL3 level. It is connected to the vL3 level through a "vL3 Line Eviction to vL4" arrow. The vL4 directory contains HP and QLO fields, and the vL4 Cache Entry maintains the same structure as the previous cache levels. As data is evicted from vL3 to vL4, the SCL access pattern information continues to be persisted. This multi-level persistence of SCL ordering information allows for long-term optimization of cache access patterns, potentially improving performance for data that frequently moves between different cache levels. In alternative embodiments, the system may implement different persistence strategies, such as only persisting QLO information for certain "hot" cache lines or using a more compact encoding for lower-level caches to reduce storage overhead.

At the bottom of the diagram is the memory entry 470. This component is connected to the vL4 level via a "vL4 Line Eviction to Memory" arrow. The Memory Entry shows content and physical OW location information, maintaining consistency with the cache entry structures above it. When data is evicted from vL4 to main memory, the system has the option to persist the SCL access pattern information. This could be done by storing the QLO value in a dedicated portion of the memory address space or by using specialized memory controllers that can maintain this metadata. Persisting SCL information in main memory allows for optimized cache line subset ordering even when data is brought back into the cache hierarchy after being evicted to main memory. However, alternative embodiments may choose not to persist this information to main memory, instead relying on rebuilding access pattern information as data is accessed again from main memory.

The eviction management example 462 demonstrates how the SCL position management technique can be applied across the entire cache hierarchy and even into main memory. By maintaining and persisting SCL access pattern information at each level, the system can continuously adapt to changing access patterns, potentially improving overall cache performance. This approach allows for fine-grained optimization of cache line subset ordering, which may be particularly beneficial in systems with large cache lines where only a portion of the line is frequently accessed.

In some embodiments, the eviction management process may include additional steps to update or refine the SCL access pattern information during eviction. For example, the system might combine heuristic information from multiple cache levels to make more informed decisions about SCL ordering. Alternatively, the system could implement a machine learning component that analyzes eviction patterns to predict future access patterns and adjust SCL orderings accordingly.

The disclosure also allows for flexibility in how SCL position management is implemented across different cache levels. For instance, lower-level caches with larger capacities might use more complex SCL reordering schemes, while higher-level caches with stricter latency requirements might use simpler, faster reordering algorithms. Additionally, the system could be designed to dynamically adjust its reordering strategies based on current workload characteristics or system performance metrics, providing adaptability to varying computational demands.

As indicated above, FIGS. 4A-4F are provided as examples. Other examples may differ from what is described with regard to FIGS. 4A-4F. The number and arrangement of aspects shown in FIGS. 4A-4F are provided as an example. There may be additional aspects, fewer aspects, different aspects, or differently arranged aspects than those shown in FIGS. 4A-4F. Furthermore, two or more aspects shown in FIGS. 4A-4F may be implemented within a single aspect, or a single aspect shown in FIGS. 4A-4F may be implemented as multiple aspects.

FIG. 5 is a diagram of an example computing environment 500 in which systems and/or methods described herein may be implemented. For example, the example computing environment 500 may be, be similar to, include, or be included in the computer system 100 shown in FIGS. 1A-1C. Various aspects of the present disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment is a term used in the present disclosure to describe any set of one, or more, storage media (also called "mediums") collectively included in a set of one, or more, storage devices that collectively include machine readable code corresponding to instructions and/or data for performing computer operations specified in a given claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as SCL position management code, included in block 550. Additionally, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501) and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Figure 6:
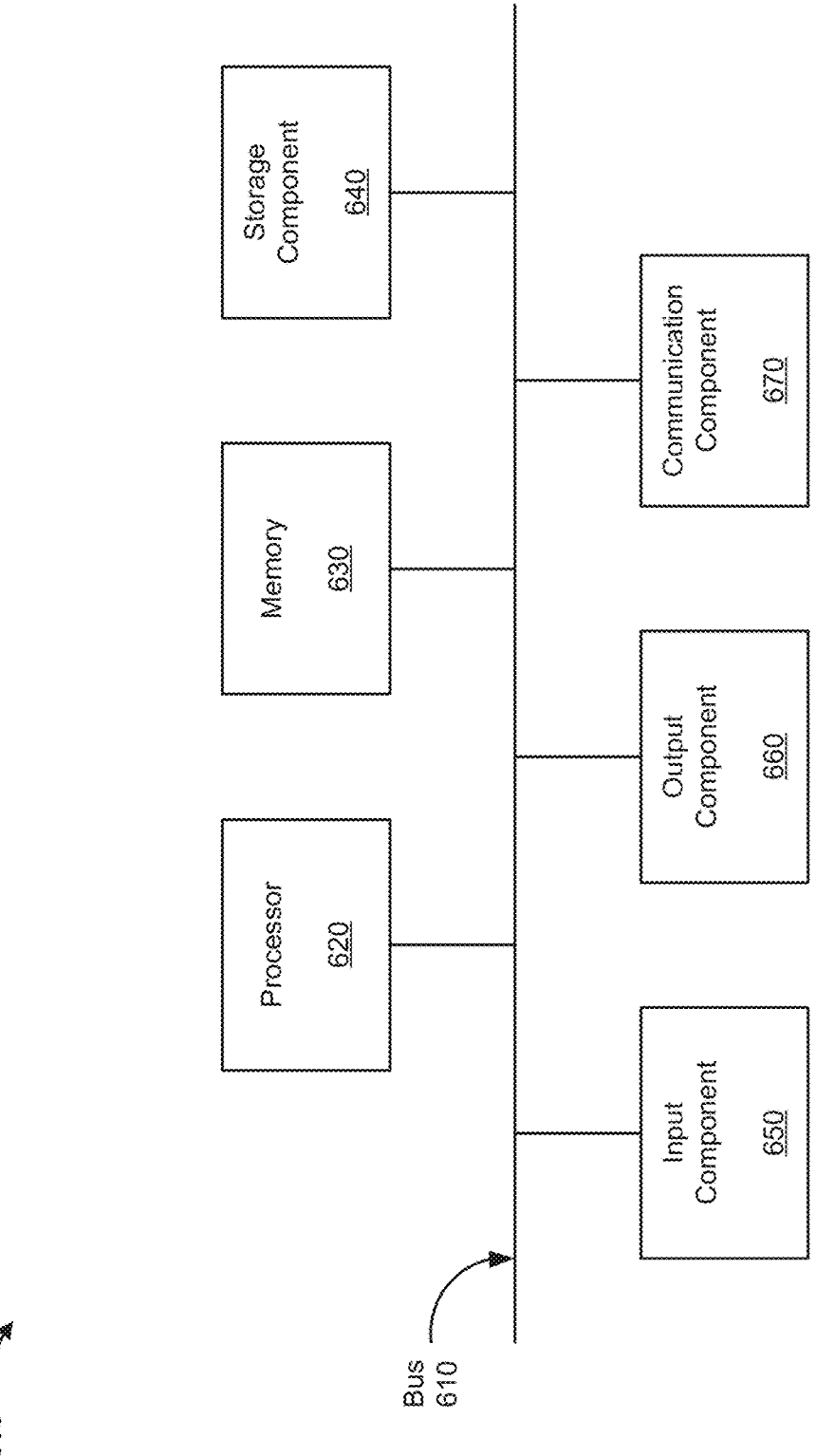
FIG. 6 is a diagram of example components of a device, which may correspond to the computer system shown in FIGS. 1A-1C.

FIG. 6 is a diagram of example components of a device 600, which may correspond to the computer system 100 shown in FIGS. 1A-1C. In some implementations, the computer system 100 may include one or more computing environments 500 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
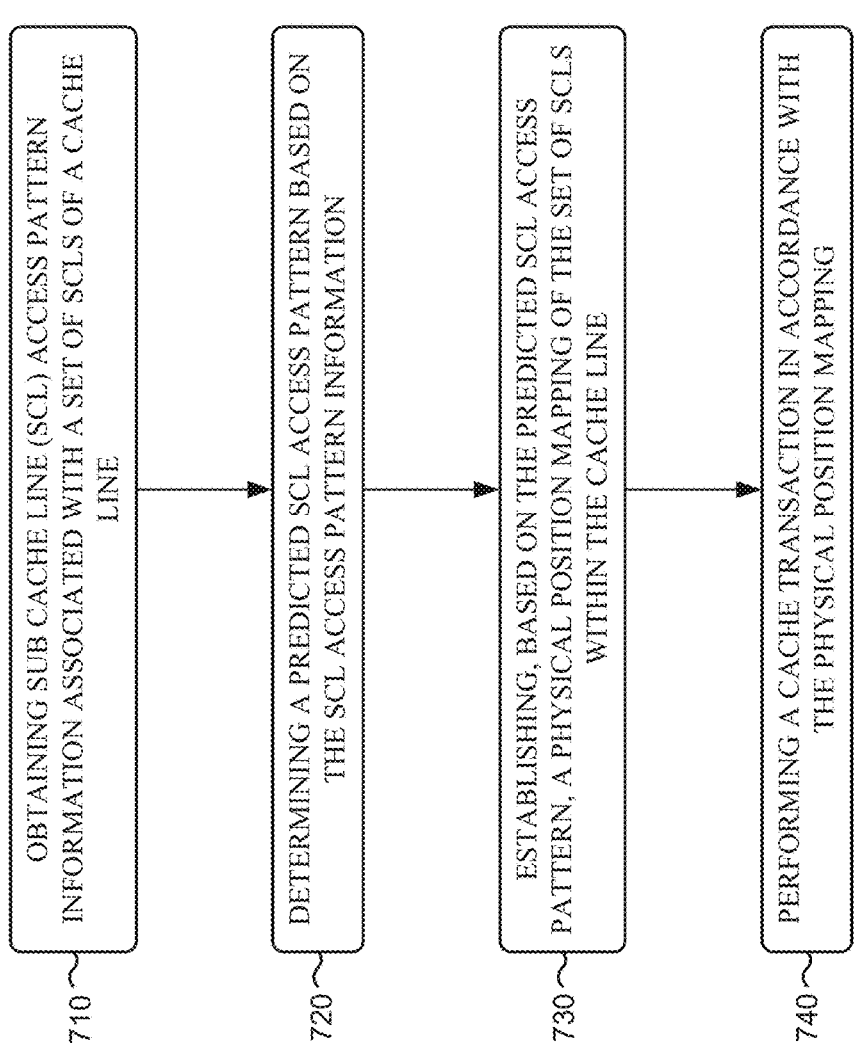
FIG. 7 is a flowchart of an example process associated with SCL position management.

FIG. 7 is a flowchart of an example process 700 associated with SCL position management as described herein. In some implementations, one or more process blocks of FIG. 7 may be performed by a line reorder controller (e.g., the line reorder controller 306 shown in FIGS. 3A-3C and/or the line reorder controller 128 shown in FIG. 1C). Additionally, or alternatively, one or more process blocks of FIG. 7 may be performed by one or more components of device 600, such as processor 620, memory 630, storage component 640, input component 650, output component 660, and/or communication component 670.

As shown in FIG. 7, the process 700 may include obtaining SCL access pattern information associated with a set of SCLs of a cache line (block 710). For example, the line reorder controller may obtain SCL access pattern information associated with a set of SCLs of a cache line, as described above in connection with FIGS. 1C-4F. In some implementations, obtaining the SCL access pattern information may include obtaining a first set of SCL access pattern information associated with a first set of cache lines and obtaining a second set of SCL access pattern information associated with a second set of cache lines.

As further shown in FIG. 7, the process 700 may include determining a predicted SCL access pattern based on the SCL access pattern information (block 720). For example, the line reorder controller may determine a predicted SCL access pattern based on the SCL access pattern information, as described above in connection with FIGS. 1C-4F. In some implementations, determining the predicted SCL access pattern may include determining the predicted SCL access pattern based on a frequency of SCL access, a prior access source, a current SCL target, prior persistence activity, and/or a cache management hint, among other examples. In some implementations, the cache management hint may include a software directed hint and/or a firmware directed hint.

As further shown in FIG. 7, the process 700 may include establishing, based on the predicted SCL access pattern, a physical position mapping of the set of SCLs within the cache line (block 730). For example, the line reorder controller may establish, based on the predicted SCL access pattern, a physical position mapping of the set of SCLs within the cache line, as described above in connection with FIGS. 1C-4F. In some implementations, establishing the physical position mapping of the set of SCLs within the cache line may include reordering a physical position of the set of SCLs within the cache line based on the predicted SCL access pattern.

As further shown in FIG. 7, the process 700 may include storing the physical position mapping in a data structure associated with the cache line (block 740). For example, the line reorder controller may store the physical position mapping in a data structure associated with the cache line, as described above in connection with FIGS. 1C-4F. As further shown in FIG. 7, the process 700 may include performing a cache transaction in accordance with the physical position mapping (block 750). For example, the line reorder controller may perform a cache transaction in accordance with the physical position mapping, as described above in connection with FIGS. 1C-4F.

In some implementations, performing the cache transaction may include performing, based on an availability status of fastpath bussing, a data return in accordance with a data return order, wherein the data return order is based on a physical proximity order or a requested order of SCLs.

In some implementations, the process 700 may include storing the SCL access pattern information in an SCL table. In some implementations, the process 700 may include storing the SCL access pattern information in a level 2 cache directory. In some implementations, the process 700 may include storing the SCL access pattern information in a hardware data structure associated with a shared cache. In some implementations, the process 700 may include storing the SCL access pattern information in a hardware data structure provided by a processor core. In some implementations, the process 700 may include storing the SCL access pattern information in software via a processor core.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
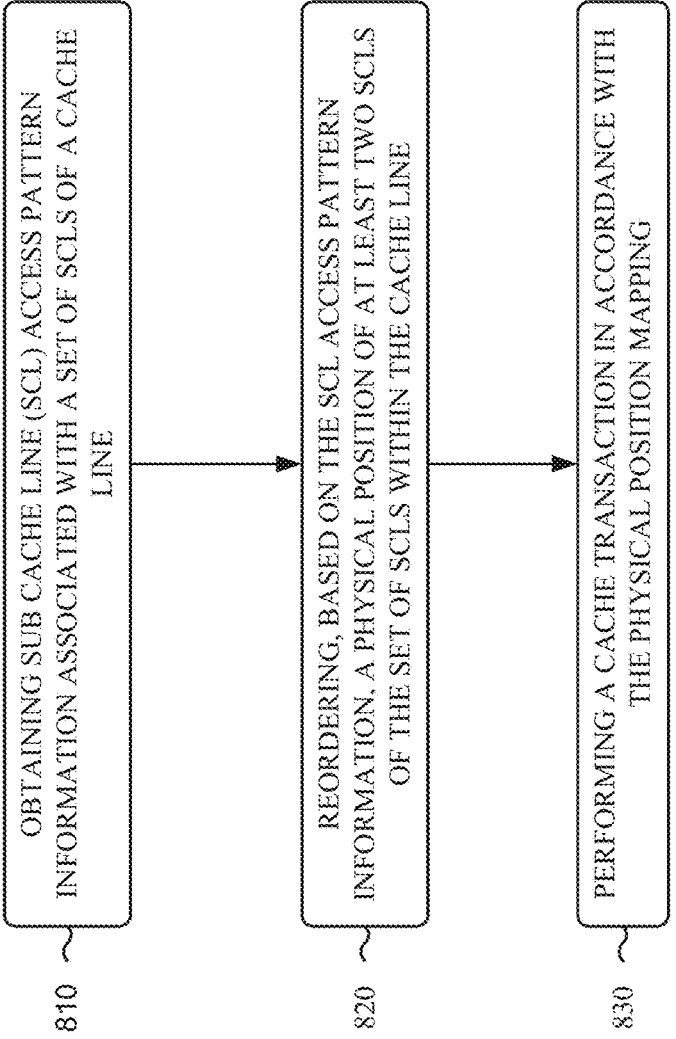
FIG. 8 is a flowchart of another example process associated with SCL position management.

FIG. 8 is a flowchart of another example process 800 associated with SCL position management as described herein. In some implementations, one or more process blocks of FIG. 8 may be performed by a line reorder controller (e.g., the line reorder controller 306 shown in FIGS. 3A-3C and/or the line reorder controller 128 shown in FIG. 1C). Additionally, or alternatively, one or more process blocks of FIG. 8 may be performed by one or more components of device 600, such as processor 620, memory 630, storage component 640, input component 650, output component 660, and/or communication component 670.

As shown in FIG. 8, the process 800 may include obtaining SCL access pattern information associated with a set of SCLs of a cache line (block 810). For example, the line reorder controller may obtain SCL access pattern information associated with a set of SCLs of a cache line, as described above in connection with FIGS. 1C-4F.

As further shown in FIG. 8, the process 800 may include reordering, based on the SCL access pattern information, a physical position of at least two SCLs of the set of SCLs within the cache line (block 820). For example, the line reorder controller may reorder, based on the SCL access pattern information, a physical position of at least two SCLs of the set of SCLs within the cache line, as described above in connection with FIGS. 1C-4F.

In some implementations, reordering the physical position of the at least two SCLs may include determining a predicted SCL access pattern based on the SCL access pattern information and establishing, based on the predicted SCL access pattern, a physical position mapping of the at least two SCLs within the cache line. Determining the predicted SCL access pattern may include determining the predicted SCL access pattern based on a frequency of SCL access, a prior access source, a current SCL target, prior persistence activity, a software directed cache management hint, and/or a firmware directed cache management hint, among other examples.

As further shown in FIG. 8, the process 800 may include performing a cache transaction in accordance with the physical position mapping (block 830). For example, the line reorder controller may perform a cache transaction in accordance with the physical position mapping, as described above in connection with FIGS. 1C-4F. In some implementations, the process 800 may further include persisting the SCL access pattern information in a main memory.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer system comprising:
   a processor set;
   one or more computer-readable storage media; and
   program instructions stored on the one or more computer-readable storage media to cause the processor set to perform operations comprising:
   obtaining sub cache line (SCL) access pattern information associated with a set of SCLs of a cache line;
   determining a predicted SCL access pattern based on the SCL access pattern information;
   establishing, based on the predicted SCL access pattern, a physical position mapping of the set of SCLs within the cache line; and
   performing a cache transaction in accordance with the physical position mapping.

2. The computer system of claim 1, the operations further comprising storing the SCL access pattern information in an SCL table.

3. The computer system of claim 1, the operations further comprising storing the SCL access pattern information in a cache directory.

4. The computer system of claim 1, the operations further comprising storing the SCL access pattern information in a hardware data structure associated with a shared cache.

5. The computer system of claim 1, the operations further comprising storing the SCL access pattern information in a hardware data structure provided by a processor core.

6. The computer system of claim 1, the operations further comprising storing the SCL access pattern information in software via a processor core.

7. The computer system of claim 1, wherein obtaining the SCL access pattern information comprises:

obtaining a first set of SCL access pattern information associated with a first set of cache lines; and obtaining a second set of SCL access pattern information associated with a second set of cache lines.

8. The computer system of claim 1, wherein determining the predicted SCL access pattern comprises:

determining the predicted SCL access pattern based on at least one of a frequency of SCL access, a prior access source, a current SCL target, prior persistence activity, or a cache management hint.

9. The computer system of claim 8, wherein the cache management hint comprises a software directed hint.

10. The computer system of claim 8, wherein the cache management hint comprises a firmware directed hint.

11. The computer system of claim 1, wherein establishing the physical position mapping of the set of SCLs within the cache line comprises:

reordering a physical position of the set of SCLs within the cache line based on the predicted SCL access pattern.

12. The computer system of claim 1, wherein performing the cache transaction comprises:

performing, based on an availability status of fastpath bussing, a data return in accordance with a data return order, wherein the data return order is based on a physical proximity order.

13. The computer system of claim 1, wherein performing the cache transaction comprises:

performing, based on an availability status of fastpath bussing, a data return in accordance with a data return order, wherein the data return order is based on a requested order of SCLs.

14. A method comprising:

obtaining sub cache line (SCL) access pattern information associated with a set of SCLs of a cache line;

reordering, based on the SCL access pattern information, a physical position of at least two SCLs of the set of SCLs within the cache line; and performing a cache transaction in accordance with a physical position mapping.

15. The method of claim 14, further comprising:

determining a predicted SCL access pattern based on the SCL access pattern information, wherein reordering the physical position of the at least two SCLs comprises reordering the physical position of the at least two SCLs based on the predicted SCL access pattern.

16. The method of claim 15, wherein determining the predicted SCL access pattern comprises:

determining the predicted SCL access pattern based on at least one of a frequency of SCL access, a prior access source, a current SCL target, prior persistence activity, or a cache management hint.

17. A computer program product comprising:

one or more computer-readable storage media; and program instructions stored on the one or more computer-readable storage media to perform operations comprising:

obtaining sub cache line (SCL) access pattern information associated with a set of SCLs of a cache line;

reordering, based on the SCL access pattern information, a physical position of at least two SCLs of the set of SCLs within the cache line; and performing a cache transaction in accordance with the physical position mapping.

18. The computer program product of claim 17, further comprising:

persisting the SCL access pattern information in a main memory.

19. The computer program product of claim 17, wherein reordering the physical position of the at least two SCLs comprises:

determining a predicted SCL access pattern based on the SCL access pattern information; and establishing, based on the predicted SCL access pattern, a physical position mapping of the at least two SCLs within the cache line.

20. The computer program product of claim 19, wherein the determining the predicted SCL access pattern comprises:

determining the predicted SCL access pattern based on at least one of a software directed cache management hint or a firmware directed cache management hint.

* * * * *